(12) United States Patent
Agblevor et al.

(10) Patent No.: US 8,979,955 B2
(45) Date of Patent: Mar. 17, 2015

(54) PRODUCTION OF PYROLYSIS OIL

(75) Inventors: Foster A. Agblevor, Logan, UT (US); Nii Ofei Mante, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 1020 days.

(21) Appl. No.: 13/029,188

(22) Filed: Feb. 17, 2011

(65) Prior Publication Data

US 2011/0213188 A1    Sep. 1, 2011

Related U.S. Application Data

(63) Continuation-in-part of application No. 12/691,385, filed on Jan. 21, 2010, now Pat. No. 8,545,581, which is a continuation-in-part of application No. 12/184,757, filed on Aug. 1, 2008, now Pat. No. 8,202,332.

(60) Provisional application No. 61/305,188, filed on Feb. 17, 2010, provisional application No. 60/953,266, filed on Aug. 1, 2007.

(51) Int. Cl.
| | |
|---|---|
| *C01B 6/24* | (2006.01) |
| *C10J 3/00* | (2006.01) |
| *C10B 47/24* | (2006.01) |
| *C10B 53/02* | (2006.01) |
| *C10C 5/00* | (2006.01) |
| *C10L 1/00* | (2006.01) |

(Continued)

(52) U.S. Cl.
CPC ............... *C10B 47/24* (2013.01); *C10B 53/02* (2013.01); *C10C 5/00* (2013.01); *C10L 1/00* (2013.01); *C10G 3/49* (2013.01); *B01J 27/053* (2013.01); *B01J 29/40* (2013.01); *Y02E 50/14* (2013.01); *Y02E 50/32* (2013.01); *C10G 2300/1059* (2013.01); *C10G 2400/02* (2013.01); *C10G 2400/04* (2013.01); *C10G 2400/08* (2013.01)

USPC ................. 48/197 R; 48/210; 48/61; 423/644

(58) Field of Classification Search
CPC ........................... B01D 46/0056; B01D 50/002
USPC ........................................ 48/197 R; 585/240
See application file for complete search history.

(56) References Cited

U.S. PATENT DOCUMENTS

| | | | |
|---|---|---|---|
| 4,508,886 A | 4/1985 | Russell et al. | |
| 5,728,271 A | 3/1998 | Piskorz et al. | |

(Continued)

FOREIGN PATENT DOCUMENTS

| | | |
|---|---|---|
| JP | 2007-153924 | 12/2008 |
| JP | 2007-153925 | 12/2008 |
| KR | 10-2006-0102778 | 1/2007 |

OTHER PUBLICATIONS

Agblevor et al., "Fast Pyrolysis of Stored Biomass Feedstocks", Energy & Fuels, 1995, pp. 635-640, vol. 9 No. 4.

(Continued)

*Primary Examiner* — Matthew Merkling
(74) *Attorney, Agent, or Firm* — Blank Rome LLP

(57) ABSTRACT

Methods for fractional catalytic pyrolysis which allow for conversion of biomass into a slate of desired products without the need for post-pyrolysis separation are described. The methods involve use of a fluid catalytic bed which is maintained at a suitable pyrolysis temperature. Biomass is added to the catalytic bed, preferably while entrained in a non-reactive gas such as nitrogen, causing the biomass to become pyrolyzed and forming the desired products in vapor and gas forms, allowing the desired products to be easily separated.

15 Claims, 20 Drawing Sheets

(51) Int. Cl.
*C10G 3/00* (2006.01)
*B01J 27/053* (2006.01)
*B01J 29/40* (2006.01)

(56) References Cited

U.S. PATENT DOCUMENTS 6,814,940 B1 11/2004 Hiltunen et al.
2009/0227823 A1* 9/2009 Huber et al. .................. 585/324

OTHER PUBLICATIONS

Scott et al., "The Flash Pyrolysis of Aspen-Poplar Wood", Canadian Journal of Chemical Engineering, 1982, pp. 666-674, vol. 60.
Graham et al., "Fast Pyrolysis of Biomass", Journal of Analytical and Applied Pyrolysis, 1984, pp. 95-135, vol. 6.
Diebold et al., "Production of Primary Pyrolysis Oils in a Vortex Reactor", Pyrolysis Oils from Biomass,Soltes, 1988, pp. 31-40, EJ.; Milne T.A., Eds.; ACS Symposium Series 376; American Chemical Society: Washington DC.
Piskorz et al., "Composition of Oils Obtained by Fast Pyrolysis of Different Woods", In Pyrolysis oils from biomass: producing. analyzing, and upgrading, Soltes, EJ. and Milne TA, Eds.; ACS Symposium Series 376; 1988, pp. 167-178, American Chemical Society: Washington DC.
Elder T. "Effect of Process Conditions on the Yield of Pyrolytic Products from Southern Pine", Wood and Fiber Science, 1984, pp. 169-179, vol. 16, No. 2.
Evans et al., "Molecular Characterization of the Pyrolysis of Biomass. 1. Fundamentals", Energy & Fuels,1987, pp. 123-137, vol. 1, No. 2.
Font et al., "Fluidized-Bed Flash Pyrolysis of Almond Shells. Temperature influence and Catalyst Screening", Industrial Engineering & Chemistry Product Research Development, 1986, pp. 491-496, vol. 25.
Maschio et al., "Pyrolysis, a Promising Route for Biomass Utilization", Bioresource Technology, 1992, pp. 219-231, vol. 42.
Besler et al., "Fluidized Bed Pyrolysis of Terrestrial Biomass Feedstocks", In Proc. Bioenergy '94, Sixth National Bioenergy Conference. Western Regional Biomass Energy Program: Golden, CO, 1994; pp. 43-50, vol. I.
Czernik et al., "The Production of Liquid Fuel by Fast Pyrolysis of Biomass", Journal of Solar Energy Engineering, 1995, pp. 2-6, vol. 117.
Scott et al., "Liquid Products from Continuous Flash Pyrolysis of Biomass", Industrial Engineering & Chemistry Product Research Development, 1985, pp. 581-588, vol. 24.
Bohn et al., "Biomass Pyrolysis with an Entrained Flow Reactor", Industrial Engineering & Chemistry Product Research Development, 1984, pp. 355-363, vol. 23.
Scott et al., "The Continuous Flash Pyrolysis of Biomass", Canadian Journal of Chemical Engineering, 1984, pp. 404-412, vol. 62.
Diebold et al., "Additives to Lower and Stabilize Viscosity of Pyrolysis Oils During Storage", Energy & Fuels, 1997, pp. 1081-1091, vol. 11, No. 5.
Aubin et al., "Study on the Corrosiveness of Wood Pyrolysis Oils", Fuel Science International, 1990, pp. 77-86, vol. 8, No. 1.
Agblevor et al., "Pyrolysis Char Catalyzed Destabilization of Biocrude Oils", In Innovative Advances in the Forest Product Industries, AICHE Symposium Series 319; American Institute of Chemical Engineers, 1998, pp. 146-150, vol. 94, New York, NY.
Agblevor et al., "Inorganic Compounds in Biomass Feedstocks. 1. Effect on the Quality of Fast Pyrolysis Oils", Energy & Fuels, 1996, pp. 293-298, vol. 10, No. 2.
Agblevor et al., "Pyrolytic Analysis and Catalytic Upgrading of Lignocellulosic Materials by Molecular Beam Mass Spectrometry", In Energy from Biomass and Wastes XVII. Institute of Gas Technology (IOT), 1993, pp. 767-795, Chicago, IL.
Sharma et al., "Upgrading of Wood-Derived Bio-Oil Over HZSM-5", Bioresource Technology, 1991, pp. 57-66, vol. 35, No. 1.
Srinivas et al., "Thermal and Catalytic Upgrading of Biomass Derived Oil in a Dual Reaction System", Canadian Journal of Chemical Engineering, 2000, pp. 343-354, vol. 78, No. 2.
Sharma et al., "Catalytic Upgrading of Biomass-Derived Oils to Transportation Fuels and Chemicals", Canadian Journal of Chemical Engineering, 1991, pp. 1071-1081, vol. 69.
Bhatiav et al., "Catalytic Conversion of *Euphorbia nerifolia* Biocrude into Petroleum Hydrocarbons. Short Communications", Fuel, 1988, pp. 1708-1709, vol. 67.
Weisz et al., "Catalytic Production of High-Grade Fuel (Gasoline) from Biomass Compounds by Shape-Selective Catalysis", Science, 1979, pp. 57-58, vol. 206.
Bahtia et al., "Upgrading of Biomass Constituents to Liquid Fuels", Fuel, 1993, pp. 101-104, vol. 72.
Diebold et al., "Biomass to Gasoline: Upgrading Pyrolysis Vapors to Aromatic Gasoline with Zeolite Catalysis at Atmospheric Pressure", In Pyrolysis Oils from Biomass; American Chemical Society, 1988, pp. 264-276, ACS Symposium Series 376, Washington, D.C.
Chum et al., "Biomass Pyrolysis Oil Feedstocks for Phenolic Adhesives", In Adhesives from Renewable Resources, Hemingway, American Chemical Society, 1989, pp. B5-151, ACS Symposium Series 385, Washington DC.
Elder, Thomas J., "The Characterization and Potential Utilization of Phenolic Compounds Found in Pyrolysis Oil", Ph.D. Dissertation, Texas A&M University, 1979, pp. iii-92.
Rolin et al.,"Catalytic Conversion of Biomass by Fast Pyrolysis", Journal of Analytical and Applied Pyrolysis, 1983, pp. 151-166, vol. 5.
Edye et al., "Transition Metals as Catalysts for Pyrolysis and Gasification of Biomass", Preprints, Fuel Chemistry Division, 1991, pp. 1715-1722, 202nd ACS National Meeting, New York, NY.
Aznar et al., "Improved Steam Gasification of Lignocellulosic Residues in a Fluidized Bed with Commercial Steam Reforming Catalyst", Industrial Engineering and Chemical Research, 1993, pp. 1-10, vol. 32.
Paisley et al., "Biomass Gasification for Gas-Turbine-Based Power Generation", Journal of Engineering/or Gas Turbines and Power, 1998, pp. 284-288, vol. 120, No. 2.
Di Blasi et al., "Countercurrent Fixed-Bed Gasification of Biomass at Laboratory Scale", Industrial Engineering and Chemical Research, 1999, pp. 2571-2581, vol. 38, No. 7.
Corella et al., "Biomass Gasification with Air in Fluidized Bed: Reforming of the Gas Composition with Commercial Steam Reforming Catalysts", Industrial Engineering and Chemical Research, 1998, pp. 4617-4624, vol. 37, No. 7.
Agblevor et al., "Production of Oxygenated Fuels from Biomass: Impact of Feedstock Storage", Fuel Science & Technology International, 1996, pp. 589-612, vol. 14, No. 4.
Horne et al., "The Effect of Zeolite ZSM-5 Catalyst Deactivation Using the Upgrading of Biomass Derived Pyrolysis Vapors", Journal of Analytical and Applied Pyrolytics, 1995, pp. 65-85, vol. 34.
Milne et al., "Standardized Analytical Methods", Biomass & Bioenergy, 1992, pp. 341-366, vol. 2, Nos. 1-6.

* cited by examiner

PRODUCTION OF PYROLYSIS OIL

This application is a continuation-in-part (CIP) of U.S. patent application Ser. No. 12/691,385, filed Jan. 21, 2010; and claims the priority of U.S. Provisional Patent Application No. 61/305,188, filed Feb. 17, 2010. U.S. patent application Ser. No. 12/691,385 is a CIP of U.S. patent application Ser. No. 12/184,757, filed Aug. 1, 2008, which in turn claims priority to U.S. Provisional Patent Application No. 60/953,266, filed Aug. 1, 2007. The disclosure of each of these prior applications is incorporated by reference in its entirety.

FIELD OF THE INVENTION

The present invention relates to processes for pyrolytic conversion of biomass materials into stable fuels and other usable products. The present invention describes a pyrolytic process wherein the biomass materials are selectively converted into desired products having long term stability while eliminating potential secondary, post-pyrolysis, processing steps.

BACKGROUND OF THE INVENTION

Conventional rapid pyrolysis (RP) of biomass is a thermal treatment process in the absence of air, which produces char, liquid, and gaseous products [1-14]. In these processes, the pyrolysis temperatures range from 450° C.-600° C. and vapor residence times are less than one second to five seconds. In the RP process, liquid production is maximized at the expense of gaseous and solid products. The liquid product (bio-oil or biocrude) is generally unstable, acidic, corrosive, viscous, and has high moisture content [15-18]. The poor stability of biocrude oils is attributed to the char and alkali metals in the oil, which catalyze secondary reactions during storage [17]. However, if the hot pyrolysis vapors are filtered to reduce the char content before condensation, the stability of the oil is improved considerably [18].

Biocrude oils are complex mixtures of carbohydrate and lignin thermal decomposition products, which cannot be used for most biobased products and fuel applications except after considerable secondary processing. Secondary processing such as catalytic upgrading [19-26], liquid-liquid extraction [27-29], or gasification [30-35] increases the cost of the final product and makes it less economically competitive relative to fossil derived products.

Catalytic studies of biomass pyrolysis products have focused on upgrading of pyrolysis oil (post pyrolysis catalysis) to higher value products [19-26], but most of these studies reported low yields of hydrocarbons, high coke/char yields, and rapid deactivation of the catalysts. Other catalytic studies of whole biomass feedstocks focused on gasification to synthesis gas [30-35], but fractional pyrolysis has not been reported in published literature.

Biomass feedstocks are composed of structural (lignin, cellulose, and hemicellulose) and non-structural (extractives) components, which have distinct chemical properties. It is conceivable to selectively convert the biomass constituents to a defined slate of chemicals and separate these products in situ (fractional pyrolysis) without necessarily going through secondary extraction and upgrading processes. Fractional pyrolysis is defined as a selective in situ conversion of biopolymers to desired products. This approach is aided by catalysts and can produce a narrow slate of pyrolysis products, which can be tailored to specific applications. This approach has potential application for converting whole biomass feedstocks, biomass-to-ethanol residues, and organosolv lignins (pulping residues) into high-value products. Potential products include synthesis gas, phenol formaldehyde resins, phosphate esters, magnetic wire, cleaning and disinfectant compounds, ore floatation, and miscellaneous applications.

As such, there remains a need in the art for processes to selectively convert biomass components in situ into suitable, stable products using suitable catalysts and thus eliminating potential secondary processing steps.

SUMMARY OF THE INVENTION

It is an object of the present invention to provide processes for the fractional catalytic pyrolysis of biomass feedstocks. The processes of the present invention both catalyze the pyrolysis of biomass feedstocks and isolate useful pyrolysis products, eliminating the need for further processing steps. The processes of the present invention provide pyrolysis products having improved stability over known methods.

The processes of the present invention involve the use of a fluidized catalyst bed maintained at a temperature suitable for pyrolysis of biomass. The biomass is entrained in the fluid used to fluidize the catalyst bed, causing the biomass to be delivered to the catalyst bed and be pyrolyzed. The catalyst bed preferably contains multiple different catalysts, and each of the catalysts is independently fluidized. The vapors and gases released during pyrolysis are carried from the fluidized catalyst bed by the fluid, where they are then collected in various fractions. As the pyrolysis products are collected in fractions, they are sufficiently isolated to be suitable for downstream uses, and no further processing steps are needed. The processes of the present invention can provide many useful pyrolysis products from a wide variety of biomass feedstocks without the need for further processing of these products. The pyrolysis products can be cracked to form fuels, such as gasoline or diesel, or used as fuel additives. The fuels produced thereby and methods for producing the fuels are also within the scope of the present invention.

It is a further object of the present invention to provide pyrolysis products produced using the pyrolysis methods of the present invention. These pyrolysis products may include oils, gases, phenolics and other pyrolysis products. The pyrolysis products of the present invention have improved stability over pyrolysis products produced by other methods and can be cracked to form fuels, such as gasoline and diesel. The pyrolysis of the present invention is stable without requiring hydrogenation.

It is yet a further embodiment of the present invention to produce fuel, preferably drop-in fuel, by co-cracking a blend of standard gas oil and pyrolysis oil. Preferably, the blend contains about 5-45% by weight of the pyrolysis oil. The cracking process can take place in a standard petrochemical refinery unit operations to produce drop-in fuels, such as gasoline, diesel, heating fuel, jet fuel, etc. The hydrogen produced from the cracking of the standard gas oil can be transferred to the biocrude oil (pyrolysis oil) to eliminate the oxygen in the product and thus producing a hydrocarbon product.

DETAILED DESCRIPTION OF THE DRAWINGS

DETAILED DESCRIPTION OF THE INVENTION

Figure 1:
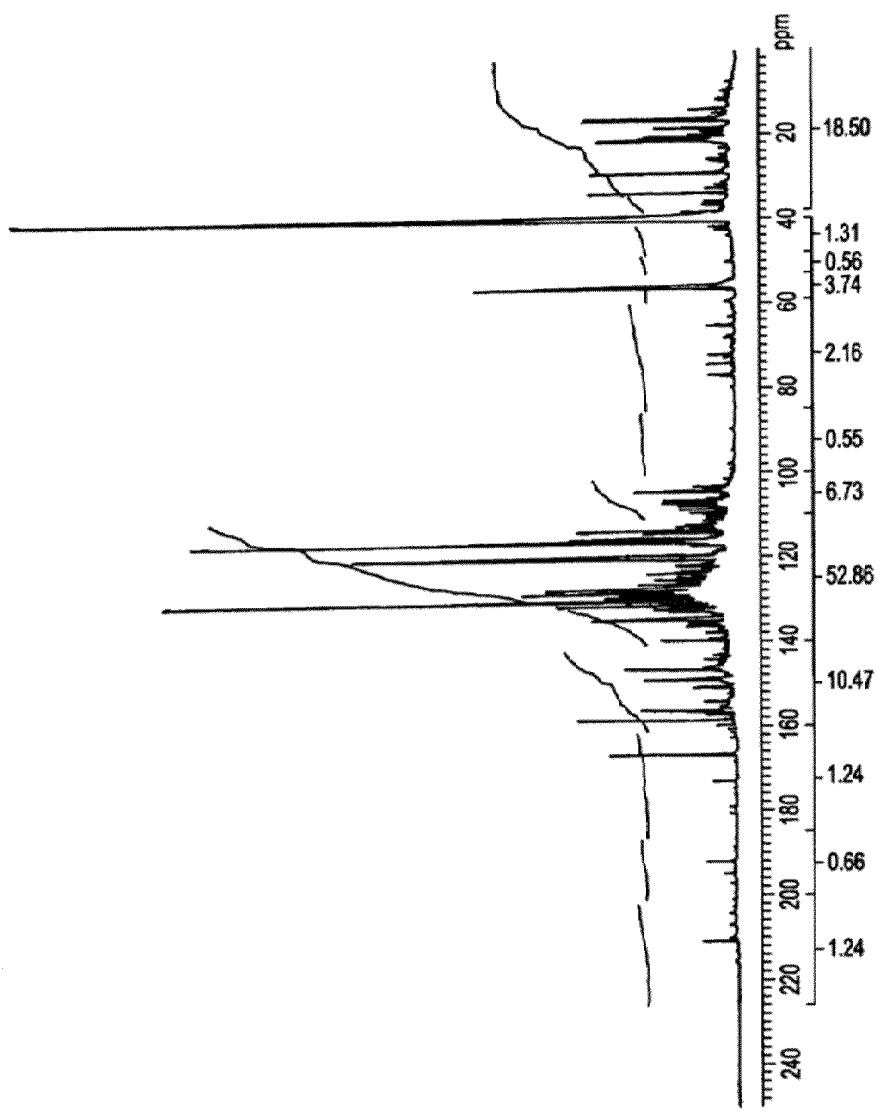
FIG. 1 shows a $^{13}$C-NMR spectrum of fractional catalytic pyrolysis liquid product of hybrid poplar wood collected from the electrostatic precipitator (ESP)

The present invention provides processes for fractional catalytic pyrolysis of biomass materials. The processes of the present invention allow for the in situ conversion of biomass components into suitable products, eliminating the need for additional processing steps.

The processes of the present invention involve the use of a suitable catalyst in a fluidized bed pyrolysis system. In typical embodiments of the present invention, the reactor used for performing the pyrolysis is a fluidized bed reactor as is well known in the art. Examples of fluidized bed reactors can be found in Howard, J. R. (1989). "Fluidized Bed Technology: Principles and Applications." New York, N.Y.: Adam Higler; Tavoulareas, S. (1991.) Fluidized-Bed Combustion Technology. Annual Reviews Inc. 16, 25-27; and Trambouze, P., & Euzen, J. (2004). "Chemical Reactors: From Design to Operation." (R. Bonormo, Trans.). Paris: Editions Technip, which are all hereby incorporated by reference. In the system of the present invention, the fluidizing medium is a suitable catalyst, and the bed is fluidized with a suitable fluid.

The biomass to be pyrolyzed is typically ground to a small particle size in order to effect rapid pyrolysis. The biomass may be ground in a mill until the desired particle size is achieved. Typically, the particle size of the biomass to be pyrolyzed is a particle size sufficient to pass through a 1-mm screen up to a particle size sufficient to pass through a 30-mm screen.

Various types of biomass may be pyrolyzed using the processes of the present invention. Biomass materials including whole plant materials, biomass residues such as residues formed during ethanol production, such as corn stover, and residues formed during distillation, such as distiller's waste grain, switchgrass, and organosolv lignins can be used as feedstock for the processes of the present invention. In certain embodiments of the invention, wood is used as the biomass feedstock. It is contemplated that any biomass feedstock which is suitable for use in a rapid pyrolysis system can be used with the fractional catalytic pyrolysis processes of the present invention.

The biomass to be pyrolyzed is loaded into an entrainment compartment to be carried into the fluidized bed by the fluid. The biomass may be loaded into a feed hopper or other device which allows for it to be delivered to the entrainment compartment in a suitable amount. In this manner, a constant amount of biomass is delivered into the entrainment compartment.

Once the biomass enters the entrainment compartment, it is carried by the fluid to the reactor bed. In certain embodiments of the present invention, the fluid used is nitrogen gas. However, it is also contemplated that other non-oxidizing fluids could be used in the processes of the present invention. In certain embodiments of the invention, the pyrolysis gas produced during the processes can be recycled and used as the entrainment fluid. In this manner, the costs of performing the pyrolysis can be greatly reduced.

The fluid carries the biomass from the entrainment compartment to the fluidized bed through a feeder tube. Typically, the feeder tube is cooled in some manner to maintain the temperature of the biomass before it enters the fluidized bed. The feeder tube may be cooled by jacketing the tube, typically with an air-cooled or liquid-cooled jacket. However, it is also contemplated that the feed tube not be cooled.

The fluidized bed of the reactor contains a catalyst suitable to produce the desired products. In certain embodiments of the present invention, the catalyst is VPISU-001, which is also known as H-ZSM-5, an alumnosilicate zeolite catalyst sold by Exxon Mobil of Irving, Tex. It is also contemplated that other zeolite catalysts can be used in the processes of the present invention. Further, it is contemplated that super acid catalysts, such as sulfated zirconium super acid catalysts, can be used for performing the processes of the present invention. Especially preferred catalysts include, but are not limited to, sand, BASF, VPI-1, VPI-2, VPI-3, VPI-4, VP1-5, VPI-6, and/or VPI-7. BASF is essentially ZSM-5 with a phosphorus content of less than 10 percent. VPI-6 is essentially ZSM-5 with a phosphorus content of 10 about percent and VPI-7 is kaolin which is used as catalyst matrix. The chemical compositions (in percent) for VPI-1, VPI-2, VPI-3, VPI-4, and VPI-5, are as follows:

|  | VPI-1 | VPI-2 | VPI-3 | VPI-4 | VPI-5 |
|---|---|---|---|---|---|
| Zeolite | 10 | 20 | 30 | 40 | 40 |
| LOI (loss on ignition) | 5 | 10 | 13 | 18 | 18 |
| $Al_2O_3$ (%) | 42 | 39 | 39 | 36 | 37 |
| $SiO_2$ (%) | 53 | 54 | 56 | 57 | 57 |
| $Na_2O$ (%) | 0.31 | 0.35 | 0.35 | 0.40 | 0.39 |
| $TiO_2$ (%) | 1.6 | 1.5 | 1.4 | 1.2 | 1.3 |
| $Fe_2O_3$ (%) | 0.87 | 0.76 | 0.72 | 0.60 | 0.61 |
| $CaO + K_2O$ (%) | 0.31 | 0.23 | 0.18 | 0.10 | 0.10 |
| MgO (%) | 0.15 | 0.12 | 0.23 | 0.19 | 0.25 |
| Rare earth elements (REO) (%) | 1.6 | 3.1 | 2.2 | 3.9 | 3.0 |
| $P_2O_5$ (%) | 0.17 | 0.14 | 0.11 | 0.08 | 0.07 |
| TSA (total surface area) $m^2/g$ | 139.1 | 264.4 | 326.8 | 456.1 | 448.3 |

Additionally, it is preferred that the catalyst has a total surface area of about 135-600 $m^2/g$, more preferably about 300-550 $m^2/g$, most preferably about 500 $m^2/g$.

Depending on the catalyst used and the desired reaction products, the catalyst temperature may be adjusted. In certain embodiments, the catalyst temperature may be between about 400° C. and about 650° C., more preferably between about 450° C. and 600° C., and most preferably between about 450° C. and about 500° C. The flow rate of the fluid is set so that the apparent pyrolysis vapor residence time is about 1 s, however, other longer or shorter vapor residence times, such as about 0.5 to about 5 seconds, may also be used with the processes of the present invention. Gas flow and other parameters, such as temperature and pressure, may be monitored from a single data acquisition unit, such as an Omega data acquisition unit from Omega Engineering, Inc. of Stamford, Conn.

In an embodiment, the reactor contains multiple different catalysts. The multiple catalysts are especially preferred when the pyrolysis products (pyrolysis oils) are cracked directly to form fuels, such as gasoline and diesel, or are used a fuel additive. When more than one catalyst are used, the catalysts are preferably selected so that they produce products having higher organics content and lower viscosity than products produced using one catalyst. This process eliminates the use of multiple reactors or subsequent processing of the pyrolysis oils. Each of the catalysts used preferably catalyzes different reactions resulting in improved quality and stability of the pyrolysis products. The catalysts used preferably have different densities and different particle size distributions, and thus, can be independently fluidized. The preferred catalyst combinations are VPI-4/sand, and MBC (moving bed catalyst)/BASF. The biomass feedstock may be fed into the reactor for as long as is necessary to process the desired amount of feedstock. A pyrolysis run may be as short as minutes and may be as long as several hours as needed. The catalysts used in the described systems retain their catalytic activity for extended periods of time, allowing for long reaction times. The rate at which biomass feedstock may be fed into the reactor may be varied depending, with typical feed rates of about 50 to about 150 g/h being used and a feed rate of about 100 g/h being preferable.

The temperature of different parts of the reactor may be measured and regulated using temperature devices known in the art such as thermocouples. If such devices are used, they may be linked to the data acquisition unit. Typically, measurements may be taken and the temperature regulated in the catalyst bed, directly above the bed, and at the exit of the reactor. The catalyst bed temperature may be measured and maintained as described above. It is desirable to have the temperature above the bed and at the exit zone of the reactor be set at a lower temperature than the catalysts to avoid cracking of the pyrolysis products. The temperature of the area above the bed and the exit zone may be the same or different, and may be between about 10° and about 100° C. less than the temperature of the catalysts, with a preferred temperature difference of about 50° C.

The gases and vapors exiting the reactor may be passed through a filter to remove solids entrained in the exiting fluid. If filters are used, it is preferred that they be hot gas filters to prevent condensation of the pyrolysis vapors. When used, the hot gas filters may be kept at a suitable temperature to prevent condensation, for example between about 300° to about 500° C. The reactor may have pressure gauges that measure the pressure at various points in the fluid stream. Total gas flow through the system may be determined by a rotameter. Feedback from these instruments may also be transmitted to the data control system.

After the pyrolysis vapors exit the reactor, they are passed through a condensation train to collect the desired products. Typically, the condensation train will comprise one or more chilled water condensers, one or more electrostatic precipitators and one or more coalescence filters, as are well known in the art, all of which will be connected in series. While the order of the condensers can be varied, it is typical that the first condenser is a water cooled condenser. When used, the electrostatic precipitator may be kept at a voltage of about 15 to about 25 kV, more preferably between about 18 to about 20 kV. The voltage of the electrostatic precipitator may also be regulated by the data acquisition unit. All gasses that pass through the condensation train may also be collected at the end of the train.

The present invention also contemplates pyrolysis products produced by the methods described herein. Oils and other products are recovered from the various condensers in the condensation train to form isolated pyrolysis products. The products isolated from at least one of the condensers will be pyrolysis products which are ready for use as fuels or chemical feedstocks. The isolated pyrolysis products will have low moisture content, lower viscosity and will be less acidic and corrosive than normal rapid pyrolysis products. Preferably, one or more of the collected fractions will contain phenolics with little to no carbohydrate pyrolysis products. Products that may be obtained using the processes of the present invention include phenols, cresols, catechols, guaiacol, methyl-substituted phenols, indene, substituted napthalene and other aromatics. Typically, the fractions of desired phenolics will contain little to no benzene, toluene, xylenes or other undesired aromatics. Of course, the pyrolysis products obtained will vary depending upon the biomass feedstock and catalysts used. Gas collected from the reactor may contain synthesis gas and other useful gases. Char and coke solids may remain in the reactor, and may be separated from the catalyst bed and collected. $C_1$-$C_4$ hydrocarbons may also be produced using the processes of the present invention. These hydrocarbons may be steam reformed into hydrogen rich gas or may be used in other applications. In certain embodiments, the pyrolysis products contain less than about 0.05% ash, greater than about 65% carbon, and greater than about 21% oxygen. Preferably, the products produced by the present process can be cracked to form a fuel.

As the pyrolysis products produced using the processes of the present invention are produced at relatively moderate temperatures, they are suitable for more downstream processing applications than products produced through higher temperature processes, such as oxidative processes. Further, as the pyrolysis products of the present invention are produced at lower temperature, they are less likely to include impurities that are formed in processes that take place at about 900° C. and above.

Overall, potential pyrolysis products may have applications as fuels, adhesives, synthesis gas, phenol formaldehyde resins, phosphate esters, magnetic wire, cleaning and disinfectant compounds, ore floatation and other applications. Importantly, the pyrolysis products obtained will be in conditions that are suitable for use in other applications without the need for extensive secondary processing steps, as are needed with rapid pyrolysis products. Further, non-limiting, examples of potential pyrolysis products are given in the examples below.

The pyrolysis products of the present invention have increased stability over pyrolysis oil produced by other methods. As is discussed in the examples below, the pyrolysis products of the present invention show minimal change in viscosity over time and may be stable for a period of 10 months or longer under ambient storage conditions. It is also contemplated that pyrolysis products having even longer stabilities, such as greater than 1 year, greater than 2 years or longer, may be produced using the processes of the present invention. The stability of the pyrolysis products may be measured by measuring the change in the viscosity of the pyrolysis product over time, or other methods for determining the stability of pyrolysis oil may be used.

Without wishing to be bound by theory, it is thought that an increase in the viscosity of biomass pyrolysis products (such as pyrolysis oil) during storage is an indication of the instability of the products because an increase in viscosity is associated with on-going chemical reactions. In certain embodiments of the invention, the pyrolysis products of the present invention show increase in viscosity of less than 25% over a storage time of 10 months at ambient temperature. In other embodiments of the invention, the pyrolysis products of the present invention show increase in viscosity of less than 20% over a storage time of 10 months at ambient temperature. In yet other embodiments, the pyrolysis products show an increase in viscosity of less than about 18% over a storage time of 10 months at ambient temperature. In further embodiments, the pyrolysis products show an increase in viscosity of less than about 15% over a storage time of 10 months at ambient temperature. In preferred embodiments, the pyrolysis products show an increase in viscosity of less than about 10% over a storage time of 10 months at ambient temperature.

The stability of the pyrolysis products of the present invention may also be described by the amount of time in which the viscosity of the pyrolysis products of the present invention remains below a certain level. For example, if the pyrolysis product can be stored at ambient temperature for a period of two years before the viscosity of the pyrolysis product increases from its original viscosity by 50%, then the stability of the pyrolysis oil at ambient temperature is considered to be two years. The percentage increase in viscosity at which the pyrolysis oil will still be considered stable will vary depending on the potential use of the oil as is known to one of skill in the art. In embodiments of the present invention, the pyrolysis oil may be considered to be stable until its viscosity has increased 50% or less, 45% or less, 40% or less, 35% or less, 30% or less, 25% or less, 20% or less, 15% or less, 10% or less, or 5% or less of the original viscosity of the pyrolysis oil.

It is also contemplated the pyrolysis products may be stored at temperatures higher or lower than ambient temperature. Storage at other temperatures may increase or decrease the stability of the pyrolysis products. The stability of a pyrolysis product stored at a temperature below or above ambient temperature can be determined by one of skill in the art using known methods, including modifications of methods described herein.

Pyrolysis products may be analyzed using techniques well known in the art, such as gas chromatography/mass spectrometry (GC/MS), gel permeation chromatography (GPC), and nuclear magnetic resonance (NMR). Non-limiting examples of analysis of pyrolysis products are shown in the examples below.

The pyrolysis oil can be cracked to produce drop-in fuel, such as gasoline, diesel, jetfuel, etc. The pyrolysis oil can be cracked by itself or blended with gas oil (derived from petroleum crude) prior to cracking. When blended with gas oil, the pyrolysis oil is preferably present at about 5-45% by weight.

Non-limiting examples of fractional catalytic pyrolysis processes are given below. It should be apparent to one of skill in the art that there are variations not specifically set forth herein that would fall within the scope and spirit of the invention as claimed below.

Example 1

Preparation of Feedstocks and Catalyst

The feedstock used for this experiment was a hybrid poplar whole wood ground in a Wiley mill (model 4) to pass a 1-mm screen. The moisture content of the feed was 5%. A proprietary catalyst (VPISU-001-H-ZMS-5 zeolite from Exxon Mobil of Irving, Tex., which was modified to suit the pyrolysis conditions) was used for the runs. Two hundred gram batches of this catalyst were used for the fluidized bed pyrolysis experiments.

Fluidized Bed Pyrolysis

The reactor consisted of a 50 mm (2-in) schedule 40 stainless steel pipe, 500 mm (20 in.) high (including a 140-mm (5.5 in.) preheater zone below the gas distribution plate) and equipped with a 100-μm porous metal gas distributor. The fluidizing medium was the above proprietary catalyst, and the bed was fluidized with nitrogen. The reactor was externally heated with a three zone electric furnace. The reactor tube contained a bubbling fluid bed with back mixing of the feed and catalyst.

The biomass was loaded into a feed hopper (batch-wise) and conveyed by a twin-screw feeder into an entrainment compartment where high-velocity nitrogen gas entrained the feed and carried it through a jacketed air-cooled feeder tube into the fluidized bed. The pyrolysis temperature was maintained at 500° C. and the apparent pyrolysis vapor residence time was about 1 s. The apparent residence time of gases and vapors is defined as the free reactor volume (the empty reactor volume minus the volume of hot catalyst) divided by the entering gas flow rate expressed at reactor conditions. A typical run lasted for 2-3 h, and the feed rate was 100 g/h. The feed rate, gas flow rate, and reactor temperature were kept constant during each run.

The catalyst and reactor temperatures were measured and controlled by three K-thermocouples inserted into a thermal well dipping into the catalyst bed. One thermocouple spanned the full length of the thermal well and this was used to measure and control the catalyst bed temperature. The next thermocouple was maintained above the bed height and the third thermocouple measured the exit temperature of the pyrolysis vapors and gases. The catalyst bed temperature was maintained at 500° C., but the area above the bed and the exit zone were nominally set at 450° C. to avoid any possible cracking of the pyrolysis products in these zones.

Pyrolysis gases and vapors exiting the reactor passed through a heated hot gas filter unit to separate char/ash and any entrained catalyst. The hot-gas filter temperature was maintained at 400° C. to avoid condensation of the pyrolysis vapors. The pyrolysis gases and vapors were then passed through a condensation train consisting of a chilled water condenser, an electrostatic precipitator, and a coalescence filter (all connected in series). The electrostatic precipitator was maintained at 18-20 kV throughout the run. The temperatures, gas flow rates, pressure drop across the reactor, and electrostatic precipitator voltage were controlled and/or monitored by an Omega data acquisition unit sold by Omega Engineering, Inc. of Stamford, Conn. Pressure drop across the hot gas filter was monitored by a pressure gage.

The gas samples were collected in syringes and analyzed after each run. Total gas flow was measured by a rotameter. To ensure good mass closure, the entire setup (excluding the rotameter) was weighed before and after the run. The pyrolysis oil collected from each condenser receiver was kept separate and analyzed by GC/MS, GPC, and $^{13}$C-NMR. The residual pyrolysis oil on the walls of the condensers was recovered (after weighing the pyrolysis unit) by rinsing the condensers with acetone. The acetone was evaporated under vacuum (40° C. and 61.3 kPa), and the oils recovered. None of the oils recovered from the acetone wash was used for analysis, because there is always some residual acetone associated with this fraction and the potential of losing some volatile components during the operation precludes it from being a true representative of the pyrolysis oil.

The char/coke content was determined by weighing the reactor/catalyst and hot gas filter before and after each run, the difference in weight was recorded as char/coke. No attempt was made to differentiate between the char and coke and no further analysis was done.

Gas Analysis

The pyrolysis gases were sampled and analyzed on a Shimadzu GC14A sold by Shimadzu Corp. of Kyoto, Japan. Three packed columns (Porapak N, molecular sieve 5A, and Hysep Q, sold by Agilent Technologies of Santa Clara, Calif.) connected in series were used to analyze the gases. The oven was temperature programmed and a thermal conductivity detector was used. The chromatogram conditions are shown below:

Columns: 3.2 mm×2 m Porapak N 80/100 mesh; and 3.2 mm×2 m Molecular sieve 5A 60/80 mesh, and 3.2×2 m Hysep Q 100/180 mesh.
Detector: Thermal conductivity (TCD) at 200° C.
Injection temperature: 150° C.
Carrier gas: helium at 30 mL/min.
Oven temperature programming:
Initial temperature: 30° C. for 3.00 min.
Level 1: Heating rate 20° C./min; final temperature 60° C. for 4 min.
Level 2: Heating rate 25° C./min; final temperature 200° C. for 9 min.
Method of separation: Column 1 (Porapak N) separated the sample into two fractions: $N_2$, $O_2$, $CH_4$ and CO which eluted quickly as one peak and were directed to column 2 (molecular sieve 5A) which separated these gases. The other fraction of the sample, which was composed of $CO_2$, $C_2$-$C_4$ gases moved very slowly and were directed to column 3 (Hysep Q) which separated them into various components. The column switching was accomplished by automatic valve switching using a Shimadzu CLASSVP program. The gas chromatogram was processed using the Shimadzu CLASSVP program.

Pyrolysis Products

During first half hour of pyrolysis, there was very little condensation of pyrolysis products and the products were mostly gases. The material balances for two fractional catalytic pyrolysis runs are shown in Table 1. Compared to rapid non-catalytic pyrolysis (RP), the total liquid yields for these runs were very low (30%), and the gas yields were very high (60%). The char/coke yields. (11.5%) were comparable to those reported for conventional pyrolysis of hybrid poplar wood [1].

TABLE 1

Material balance on catalytic pyrolysis of hybrid poplar feedstock (on as received basis).

| Fractions | Run 1461-40 #4 | Run 1461-42 #5 | | |
|---|---|---|---|---|
| Gas Yield (%) | 60 | 55.0 | | |
| Total Liquids (%) | 30.6 | 30.1 | | |
| Char/Coke (%) | 11.5 | 11.9 | | |
| Total | 102.1 | 97.0 | | |
| Liquid Fractions collected | | | Color | # Phases |
| Chilled Water Condenser (g) | 19.9 | 18.9 | Brown | 1 |
| Ice/Water Condenser (g)* | 14.7 | 16.8 | Yellow | 1 |
| ESP (g) | 25.7 | 25.3 | Brown | 1 |
| Total Liquids (g) | 60.3 | 61 | Brown | 2 |
| Total Biomass Pyrolyzed (g) | 197 | 202 | | |

*This fraction had 95% water and 5% dissolved organics.

Three liquid fractions from the first two condensers and the ESP that were very different from RP oils were obtained. The liquid from the first condenser was brown, with extremely low viscosity and flowed freely at room temperature. The liquid from the second condenser was light yellow and also had very low viscosity and appeared to be 95% water and 5% dissolved organics. The liquid from the ESP was similar to that from the first condenser in appearance and viscosity. The liquids from the first condenser and the ESP were immiscible with water and formed two phases when water was added. However, for conventional pyrolysis, the liquid product was miscible with water. The fractional pyrolysis oil appeared to be less viscous than the corresponding conventional rapid pyrolysis oil.

GC/MS analysis of the liquid from the first condenser and the ESP showed similar chemical composition. The liquids composition was almost exclusively phenolics with minimal carbohydrate pyrolysis products (see Table 2). The constituents of the liquids from these two liquid fractions were mostly phenol, cresols, guaiacol, methyl-substituted phenols, small quantities of indene, and substituted naphthalenes. Neither benzene, toluene, nor xylenes were detected in any of the products (see Table 2). These results were confirmed by $^{13}$C-NMR analysis of the liquid products. The $^{13}$C-NMR data however, showed a small fraction of carbohydrate decomposition products in the oils. The GC/MS analysis of the whole oil of non-catalytic pyrolysis of hybrid poplar as well as the phenol neutral (PN) fraction extracted from the whole oil are also shown in Table 2 to illustrate the differences between the oils. Whereas the catalytic pyrolysis oil and the PN oils have very low carbohydrate decomposition products, the whole oil is very rich in such products. The oils from the ESP and the first condenser are even richer in phenolics than the PN oil.

TABLE 2

GC/MS estimated composition of catalytic pyrolysis oils. The same mass of oil was used for all samples analyze. The first three samples are from run 1461-40 #4, the next three are from run 1461-42 #5. All data are raw area counts (×10⁶) but because the same mass of sample was used the results could be compared on relative basis.

| | (area counts × $10^6$) Catalytic | | | | | | Non-Catalytic | |
|---|---|---|---|---|---|---|---|---|
| Analyze | SG1461-040 $1^{st}$ Cond | SG1461-04 $2^{nd}$ Cond | SG1461-04 ESP | SG1461-04 $21^{st}$ Cond | SG1461-04 $22^{nd}$ Cond | SG1461-04 2ESP | Whole Poplar Oil | Run 160 Poplar PN |
| Hydroxyacetaldehyde | 0 | 37 | 0 | 21 | 19 | 0 | 46 | 0 |
| Hydroxyacetone | 0 | 32 | 0 | 0 | 19 | 0 | 175 | 0 |
| Ethenedial | 0 | 20 | 0 | 0 | 10 | 0 | 0 | 0 |
| 2-cyclopenten-1-one | 194 | 50 | 194 | 163 | 33 | 193 | 24 | 35 |
| 3-methyl-2cyclopentone-1-one | 41 | 0 | 36 | 30 | 0 | 32 | 0 | 0 |
| Phenol | 373 | 49 | 350 | 333 | 30 | 356 | 119 | 222 |
| Indan | 12 | 0 | 15 | 10 | 0 | 13 | 0 | 13 |
| Indene | 36 | 0 | 43 | 32 | 0 | 46 | 0 | 11 |
| 2-methyl phenol (o-cresol) | 239 | 18 | 234 | 201 | 11 | 234 | 30 | 68 |
| 4-methyl phenol (p-cresol) | 419 | 18 | 137 | 316 | 11 | 362 | 19 | 55 |
| 2-methoxy phenol (guaiacol) | 60 | 0 | 61 | 48 | 0 | 60 | 29 | 41 |
| methylbenzofuran | 37 | 0 | 44 | 36 | 0 | 47 | 0 | 13 |
| 2,4-dimethyl phenol | 131 | 0 | 128 | 97 | 0 | 119 | 13 | 24 |
| dimethyl phenol | 201 | 0 | 184 | 138 | 0 | 176 | 0 | 17 |
| 3,5-dimethyl phenol | 0 | 0 | 0 | 0 | 0 | 0 | 0 | 0 |
| 1,2-dihydroxy benzene (calechol) | 213 | 0 | 130 | 104 | 0 | 123 | 33 | 191 |
| 2-methoxy-4-methyl phenol (4-methyl guaiacol) | 0 | 0 | 0 | 0 | 0 | 0 | 0 | 0 |
| Naphthalene | 69 | 0 | 76 | 68 | 0 | 79 | 12 | 0 |
| 2,4,6-trimethy phenol | 47 | 0 | 45 | 38 | 0 | 44 | 0 | 20 |
| 1,2-dihydroxy-3-methyl benzene (3-methyl catachol) | 55 | 0 | 67 | 58 | 0 | 78 | 24 | 76 |
| dimethylindene/trimethyl phenol | 192 | 0 | 185 | 138 | 0 | 182 | 0 | 36 |
| 2-methoxy-4-ethyl phenol (4-ethyl guaiacol) | 46 | 0 | 47 | 35 | 0 | 54 | 23 | 39 |
| 2-methyl naphthalene | 169 | 0 | 184 | 124 | 0 | 159 | 0 | 0 |
| 1-methyl naphthalene | 0 | 0 | 0 | 0 | 0 | 0 | 0 | 0 |
| 2,6-dimethoxy phenol | 113 | 0 | 118 | 98 | 0 | 122 | 68 | 92 |
| Methyl benzofuron/cinnamaldehyde | 208 | 0 | 187 | 119 | 0 | 205 | 0 | 44 |
| 2-ethyl napthalene | 0 | 0 | 0 | 0 | 0 | 81 | 14 | 25 |
| dimethyl napthalene | 229 | 0 | 221 | 143 | 0 | 204 | 0 | 0 |
| 2,6-dimethoxy-4-methyl phenol | 164 | 0 | 152 | 93 | 0 | 157 | 43 | 41 |
| 1-(4-hydroxy-3-methoxy phenyl) propene | 182 | 0 | 181 | 119 | 0 | 175 | 53 | 68 |
| Levoghican | 0 | 0 | 0 | 0 | 0 | 0 | 213 | 0 |
| syringcaldehyde | 152 | 0 | 171 | 85 | 0 | 152 | 0 | 36 |
| 1-(3,5-dimethoxy-4-dydroxy phenyl) propene/3-methoxy-4-hydroxy cinnamic acid | 174 | 0 | 278 | 116 | 0 | 264 | 61 | 61 |

Figure 2:
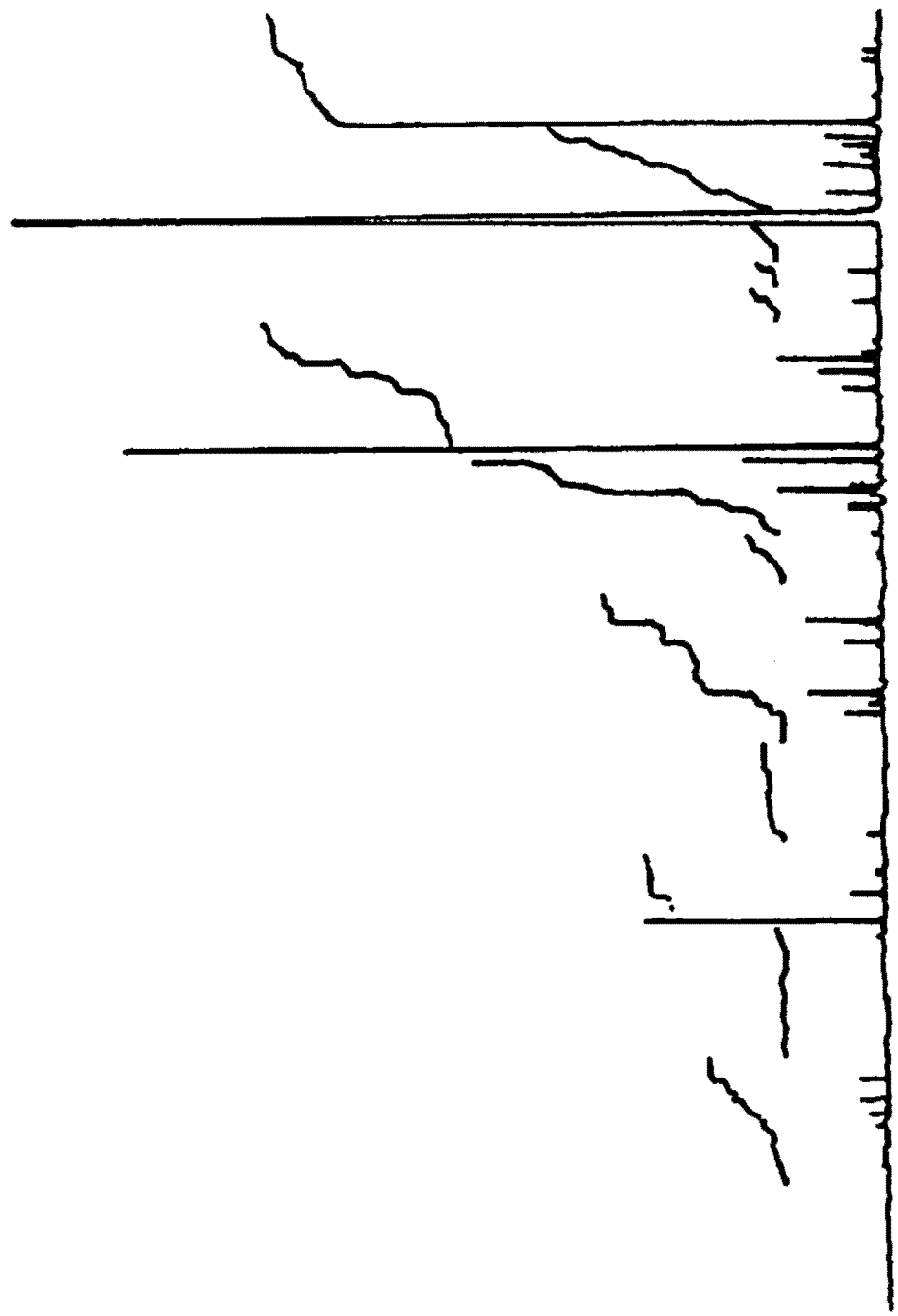
FIG. 2 shows a $^{13}$C-NMR spectrum of fractional catalytic pyrolysis liquid product of hybrid poplar wood from the chilled water (second) condenser.
Figure 3:
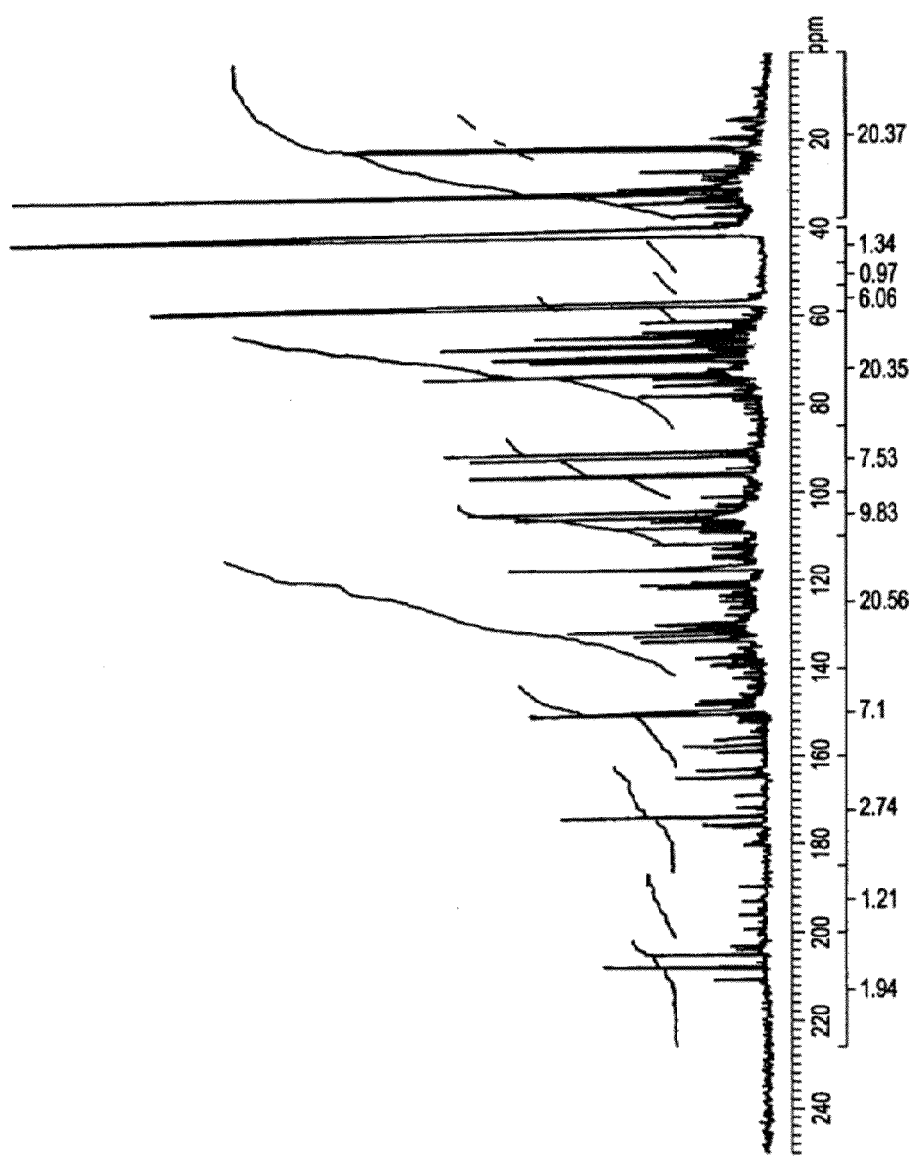
FIG. 3 shows a $^{13}$C-NMR spectrum of conventional rapid pyrolysis liquid product of hybrid poplar wood.

The $^{13}$C-NMR spectra of the two catalytic pyrolysis liquids and the RP oil are shown in FIGS. 1, 2, and 3. The signals between 0 ppm to 35 ppm were due to side chains; signals from 60 ppm to 100 ppm derived from carbohydrate degradation products whereas those from 100 ppm to 160 ppm derived from lignin or phenolic compounds. The signals at 210 ppm were due to carboxylic carbons. It is clear from FIGS. 1, 2, and 3 that the catalytic pyrolysis liquids lost most of their carbohydrate degradation components whereas the RP oil retained all those components.

It is interesting to note the difference in the height of the methoxyl peak at 58 ppm in the NMR spectra of the catalytic and non-catalytic products. The catalytic pyrolysis oils appeared to be less methoxylated than the non-catalytic pyrolysis oils. This suggests that either demethylation or demethoxylation reactions took place during the process.

The liquid from the first condenser, which appeared to be mostly water contained carbohydrate decomposition products such as hydroxyacetaldehyde, hydroxyacetone, ethanedial and 2-cyclopentene-1-one in addition to phenol and cresols. The product slate from this fraction was extremely narrow and this was confirmed by the $^{13}$C-NMR results (see FIG. 2).

The char/coke yields from these runs were low compared to those reported for post pyrolysis catalysis [19-26, 37]. These yields were comparable to those obtained for only the char fraction of RP solid products. No attempt was made to distinguish between coke and, char and no further analysis of this solid product was carried out.

The gas yields were high compared to the RP process. The gaseous product was a mixture of $C_1$-$C_4$ hydrocarbons, carbon monoxide (CO), and carbon dioxide ($CO_2$). About 90% by weight of the gaseous products was CO and $CO_2$ and the rest was a mixture of hydrocarbons. The hydrocarbons detected by gas chromatography were methane, ethane, propane, butane, ethylene, and butene. Three other small peaks were present in the chromatogram but these were not identified. Butene was the most abundant hydrocarbon and in some cases constituted 30% of the total hydrocarbon products.

The elemental composition of the liquid products shown in Table 3 had high carbon (71%) and relatively low oxygen content (21%) compared to non-catalytic pyrolysis oils. The HHV was consequently high (30.5 MJ/kg) compared to 23 MJ/kg for the non-catalylic pyrolysis oil. Typical non-catalytic pyrolysis oils from hybrid poplar have 54-57% carbon and 36-38% oxygen and HHVs 23-24 MJ/kg [1].

TABLE 3

Elemental composition and HHV of fractional pyrolysis liquid products of hybrid poplar wood.

| Element | Composition |
| --- | --- |
| Carbon (%) | 71.32 |
| Hydrogen (%) | 6.82 |
| Oxygen (%) | 21.41 |
| Nitrogen (%) | 0.24 |
| Sulfur (%) | 0.01 |
| Ash (%) | 0.09 |
| HHV (MJ/kg) | 30.5 |

Molecular Weight Distribution of Liquid Products

Figure 4:
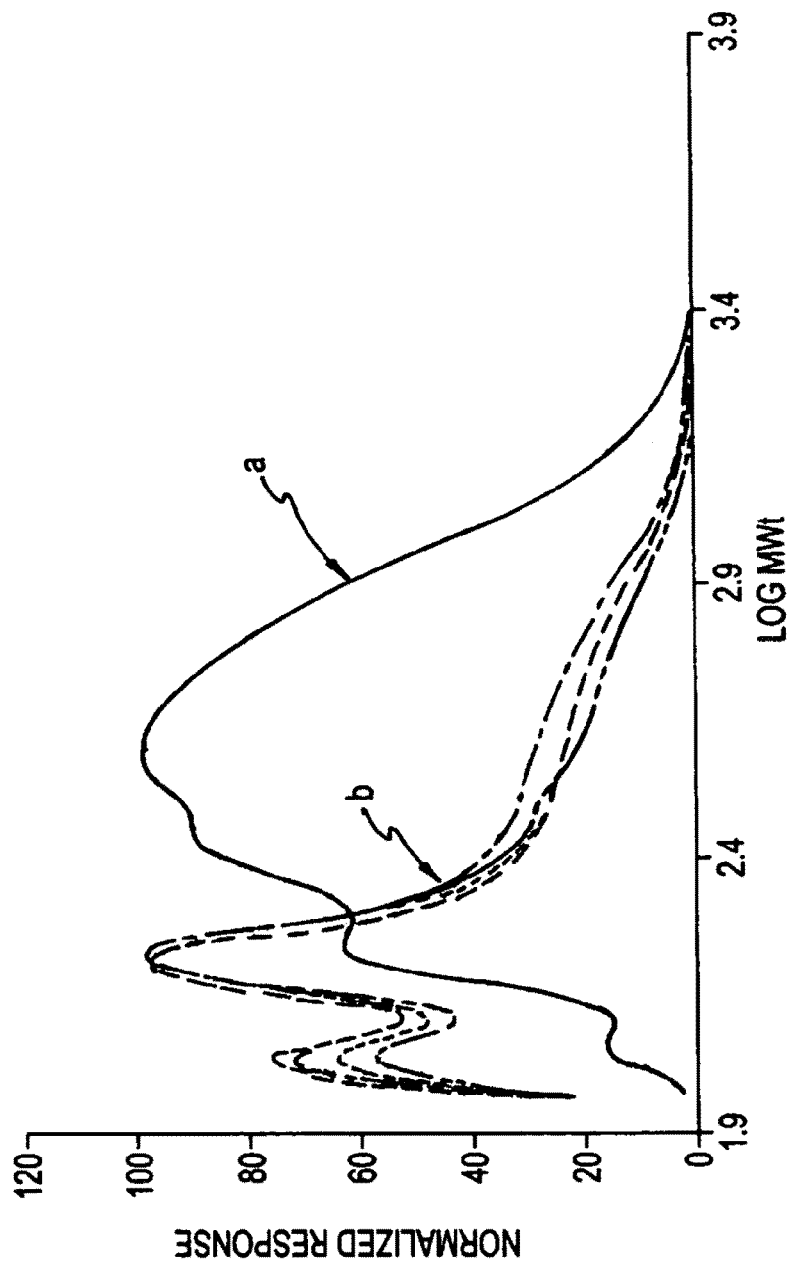
FIG. 4 shows a plot of the molecular weight distribution of hybrid poplar catalytic pyrolysis oil and phenol/neutral fraction extracted from sugar cane bagasse conventional rapid pyrolysis oil: a) bagasse phenol/neutral fraction; and b) hybrid poplar catalytic pyrolysis oil.

Gel permeation chromatography (GPC) of the liquid products showed very low molecular mass distribution of the products. The number average molecular weight (Mn) of the oil from the ESP and the chilled water condenser were both 160 while the weight average molecular weight (Mw) distribution were 215 and 220 for the ESP and chilled water condenser oils respectively. The molecular mass distribution of these products was about one half those reported for phenol/neutral fraction of conventional rapid pyrolysis products (Mn=290, Mw=440) (FIG. 4).

Catalyst Activity

Figure 5:
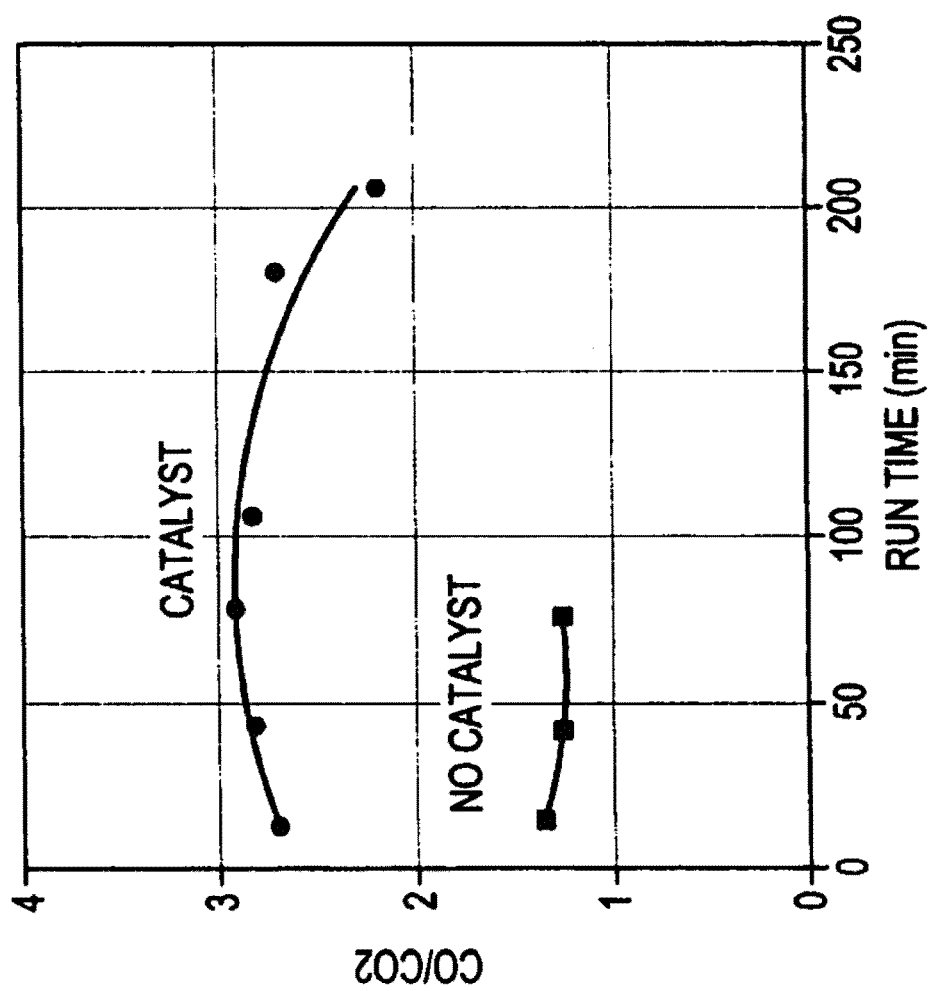
FIG. 5 shows a plot of the variation of carbon monoxide and carbon dioxide content during fractional and conventional pyrolysis of hybrid poplar wood.

The CO and $CO_2$ concentrations appeared to vary with time during the catalytic pyrolysis. The variation was probably due to catalyst deactivation. In these studies catalyst activity was monitored by following the variation in CO and $CO_2$ composition in the gaseous product mixture. From the GC analysis of the gases, we compared $CO/CO_2$ ratio of the catalytic pyrolysis process with a non-catalytic pyrolysis process. The non-catalytic process was carried out in a silica sand media. The $CO/CO_2$ ratio for the catalytic pyrolysis process decreased with time and appeared to approach the non-catalytic pyrolysis $CO/CO_2$ ratio (FIG. 5). However, the run was not carried on far enough to prove whether the activity was asymptotic to the silica sand pyrolysis or it dropped to that value.

The $CO/CO_2$ ratio varied from 2.2 to 2.8 during the runs. At the early stages of the run, the ratio was high but gradually decreased with time. In contrast, CO/C02 ratio for noncatalyzed reactions was typically 1.3-1.4 (see FIG. 5) and remained almost constant throughout each run. If we assume that this ratio is a true monitor of catalytic activity, then it appears the catalyst was still active after three hours run albeit less active than the fresh catalyst. This finding is significant because it provides a simple method for monitoring catalyst activity.

Discussion of Experimental Results

The fractional catalytic pyrolysis results above were compared with the non-catalytic process, however, could such comparisons be justified? The two processes could be compared because the degree of conversion was similar for both cases. The conversion was defined as:

$$\frac{[\text{Mass of Original feed (raw biomass)} - \text{Mass of unconverted feed}] * 100}{[\text{Mass of original feed (raw biomass)}]}.$$

The unconverted feed in this case was the char/ash. The char/ash for the catalytic pyrolysis was about 11.5%, which was similar to what was obtained for non-catalytic processes.

Under post-pyrolysis catalysis conditions, biomass feedstocks tend to produce very high coke yields, which rapidly deactivate the catalyst [19, 20, 37]. The post pyrolysis catalysis liquid products usually contain benzene, toluene, xylene, naphthalenes, substituted benzene and naphthalenic products [19, 20, 22]. On the contrary, in the fractional catalytic pyrolysis process where the catalyst and the biomass feed were mixed the catalyst was still active after 3 hours of pyrolysis and the product slate was quite different from those reported for post pyrolysis catalysis (see FIGS. 1&3). The total char/coke yield was equivalent to the coke yield alone from the post pyrolysis catalysis runs [19, 20, 22]. The gaseous components were however similar for both processes.

Clearly, in the fractional catalytic process, there appeared to be a selective pyrolysis and gasification of the biomass components. The carbohydrate degradation products appeared to be more labile than the lignin degradation components. Thus, the carbohydrate pyrolysis products were rapidly converted into gaseous products while the lignin pyrolysis products were more refractory. The gaseous products were mostly carbon dioxide, carbon monoxide and $C_1$-$C_4$ hydrocarbons. As the catalyst slowly deactivated, it appeared some carbohydrate pyrolysis products such as hydroxyacetaldehyde, ethanedial, hydroxyacetone, and cyclopeteneone were not cracked and these condensed with the aqueous phase in the chilled water condenser.

On the contrary, the lignin pyrolysis products underwent limited gasification reactions and formed the bulk of the liquid products. Demethylation, demethoxylation and alkylation of the aromatic ring appeared to be the predominant reactions. The presence of high proportions of cresols and dihydroxy phenols (catechol) suggested that demethylation, demethoxylation and cleavage of the lignin decomposition products occurred. The presence of methyl and ethyl phenols in the liquid product also suggested that there might have been some alkylation reactions.

The yield of the liquid products also supported the above explanation. The total liquid yield was only 30% and the water content was 30-40%. This implies that the organic liquid yield was only 18-21%. The total lignin content of hybrid poplar wood is about 22-24% [38], and thus taking into consideration the demethoxylation reactions and loss of some side chains, the above organic liquid yield appear to be reasonable. Thus, the fractional catalytic pyrolysis appeared to favor production of modified liquid phenolics from the lignin fraction of the biomass while converting the carbohydrate fraction to gases.

Catalyst Deactivation

The absence of liquid condensate in any significant quantities during the first hour of pyrolysis suggested that during this phase of the pyrolysis, the catalyst was extremely active and the major reaction was gasification. Coke formation appeared to be minimal at worst because the sum of coke and char from the pyrolysis process was only 12%. This could be attributed to the minimal secondary conversion of the primary lignin pyrolysis products to hydrocarbons. These suggest that the lignin pyrolysis products were mostly responsible for the coke formation reactions and thus contribute strongly to the deactivation of the catalyst, especially as obtains in post pyrolysis catalysis.

The rejection of oxygen in the feed as CO and water provides a simple method for following the deactivation of the catalyst. As shown in FIG. 5, during non-catalytic pyrolysis, the ratio of $CO/CO_2$ was almost constant and close to one, but during catalytic pyrolysis, this ratio varied with time and approached the non-catalytic value. This trend implied that the catalyst was gradually deactivating and when the catalyst is completely deactivated, the ratio of $CO/CO_2$ will be similar to that of the non-catalytic process.

Conclusions

The above demonstrates the concept of fractional pyrolysis of biomass. The most important factor is the choice of catalyst. By selecting a suitable catalyst, various components of the biomass feedstocks can be converted in situ into desirable products. This work showed that the lignin fraction of the biomass could be effectively converted into phenolics with low char yield when catalysis and pyrolysis reactions were performed simultaneously. Char yields for this process were similar to those obtained from conventional rapid pyrolysis. The molecular mass distribution of fractional catalytic pyrolysis process were about one half that obtained for phenol/neutral fraction in a conventional pyrolysis and there appeared to be considerable demethylation and demethoxylation reactions.

Example 2

Materials

Logs of hybrid poplar wood were first disc ground to a course fraction, air-dried at ambient laboratory temperature to equilibrium moisture content and then knife milled (Wiley mill model 4) until all the particles passed through a 1-mm mesh screen. The moisture contents of the materials were determined using an infra-red moisture analyzer. Granular HZSM5 supplied by BASF Inc. (BASF Inc, Florham Park, N.J.) was used for the pyrolysis studies.

Pyrolysis of Biomass

The ground biomass material (4200 g) was loaded into a K-Tron gravimetric feeder hopper and fed into a 2 kg/h bubbling fluidized bed pyrolysis reactor containing the catalyst as the fluidizing medium. The fractional catalytic pyrolysis was conducted at a temperature of 450-500° C. using ZSM5 catalyst. The 10 cm bubbling fluidized bed reactor was charged with 1 kg of catalyst. The bed was initially fluidized with 2 SCFM of nitrogen but was replaced gradually with the producer gas from the catalytic pyrolysis until the fluidizing gas was made up of 0.2 SCFM of nitrogen and 1.7 SCFM of producer gas. The reactor was maintained at an average temperature of 450° C. The mixture of char, gases and vapors that exited from the reactor was separated by a hot gas filter maintained at 350° C. The separated gases and vapors were then passed through two condensers connected in series and an electrostatic precipitator (ESP) kept at 15 kV. The fractional catalytic pyrolysis oil (FCP oil) was collected from the condensers and used in the subsequent studies.

Storage of FCP Oils

About 50 mL each of FCP oils were placed in 125 mL graduated volumetric bottles and tightly caped. The oil samples were stored under laboratory ambient conditions for more than 314 days. After the storage period the viscosity, pH, Karl Fischer water content, and densities of the samples were measured and compared to those determined for the fresh FCP oil samples as described below.

Analysis of FCP Oils

The pH of the FCP oils was measured using an Accumet pH Meter with Accumet pH probe (Cole-Parmer Instrument Company, Vernon Hills, Ill.). The pH data were obtained after 5-10 min stabilization of the mechanically stirred oil. A Brookfield DV-II+ Pro viscometer equipped with thermosel temperature controller (Brookfield Engineering Laboratory Inc, Middlesboro, Mass.) was used to measure the viscosities of the FCP oils. The temperatures of the FCP oil samples were maintained constant with thermoset and about 7 mL of sample was used per viscosity measurement. The dynamic viscosities of the FCP oils were measured at 40° C. using spindle number SC18 and the spinning rates were selected to match the viscosity of the oil. Viscosities were measured for both the stored and fresh FCP oils.

A Metrohm 701KF Titrino equipped with a 703 titration stand setup (Brinkmann Instruments, Inc, NY) was used for the Volumetric Karl Fischer titration. 50 mL of methanol was placed in the titration vessel and conditioned and about 60-100 mg of oil sample was loaded into a hypodermic plastic syringe and weighed. The sample was injected into the titration solvent and the syringe was weighed again. The water content was titrated volumetrically and using Hydranal® Composite 5 reagent.

The densities of the oils were determined at 23° C. using a Mettler Toledo DA-110M density meter (Greifensee, Switzerland) according to ASTM D4052. Calibrations were done prior to measurements with distilled water free from bubbles. The values were reported to 3 decimal places in $g/cm^3$ High-Temperature Simulated Distillation of FCP Oils Simulated distillation (SimDist) is a gas chromatography (GC) technique which separates individual hydrocarbon components in the order of their boiling points, and is used to simulate the time-consuming laboratory-scale physical distillation procedure known as true boiling point (TBP) distillation. The separation is accomplished with a nonpolar chromatography column using a gas chromatograph equipped with an oven and injector that can be temperature programmed. A flame ionization detector (FID) is used for detection and measurement of the hydrocarbon analytes. The result of SimDist analysis provides a quantitative percent mass yield as a function of boiling point of the hydrocarbon components of the sample. The chromatographic elution times of the hydrocarbons are calibrated to the atmospheric equivalent boiling point (AEBP) of the paraffins reference material. The SimDist method ASTM (ASTM International) D2887 covers the boiling range 55-538° C. (100-1000° F.) which covers the n-alkanes (n-paraffins) of chain length about C5-C44. The high-temperature simulated distillation (HTSD) method covers the boiling range 36-750° C. (97-1382° F.) which covers the n-alkane range of about C5-C120. A key difference between ASTM D2887 and HTSD is the ability of the latter technique to handle residue containing samples (i.e. material boiling>538° C., 1000° F.). The FCP oils were characterized using the HTSD method. The distillation was done by BASF Inc. analytical laboratory.

Physical Properties of Oils

The physical properties of the fresh and stored FCP oil and conventional rapid pyrolysis oil are shown in Table 4. The oils had relatively high moisture content and they had acidic pH. An increase in the viscosity of biomass pyrolysis oil during storage is an indication of the stability of the oils because increase in viscosity is associated with on-going chemical reactions. The dynamic viscosity of freshly prepared FCP oil (11.2 cP) was several factors lower than that of rapid pyrolysis oil (56.2 cP) prepared on sand fluidizing medium. After 314 days (>10 months) storage at ambient laboratory conditions, the dynamic viscosity of the FCP oil increased from 11.2 cP to 12.7 cP, which is several times smaller than the viscosity of freshly prepared conventional hybrid poplar pyrolysis oil whose viscosity was 56.2 cP. Thus, it appears that reactions that lead to increase in viscosity were minimal in the FCP oils. The minimal change viscosity observed in the FCP oil is superior to those reported by Czemik et al. [15] who used methanol and other alcohols to stabilize hybrid poplar pyrolysis oils.

TABLE 4

Yield and viscosity data of fresh and stored pyrolysis oil

|  | FCP Oil | RP oil |
|---|---|---|
| Oil yield (%) | 34.20 | 63.0 |
| Gas yield (%) | 34.20 | 15.0 |
| Char yield (%) | 14.20 | 20.0 |
| Properties of oils | | |
| Fresh oils | | |
| Viscosity (cP) @40° C. | 11.24 ± 0.20 | 56.27 ± 0.12 |
| Karl Fischer Moisture (%) | 8.59 ± 0.40 | 23.74 ± 1.87 |
| pH | 3.53 ± 0.04 | 2.53 ± 0.03 |
| Density (g/cm$^3$) | 1.116 ± 0.001 | 1.216 ± 0.001 |
| Stored oil after 314 days | | |
| Viscosity (cP) @ 40° C. | 12.70 ± 0.20 | n/a |
| Karl Fischer Moisture (%) | 8.66 ± 0.20 | n/a |
| pH | 3.73 ± 0.03 | n/a |
| Density (g/cm$^3$) | 1.117 ± 0.001 | n/a |

High Temperature Simulated Distillation (HSTD) of FCP Oils

Figure 6:
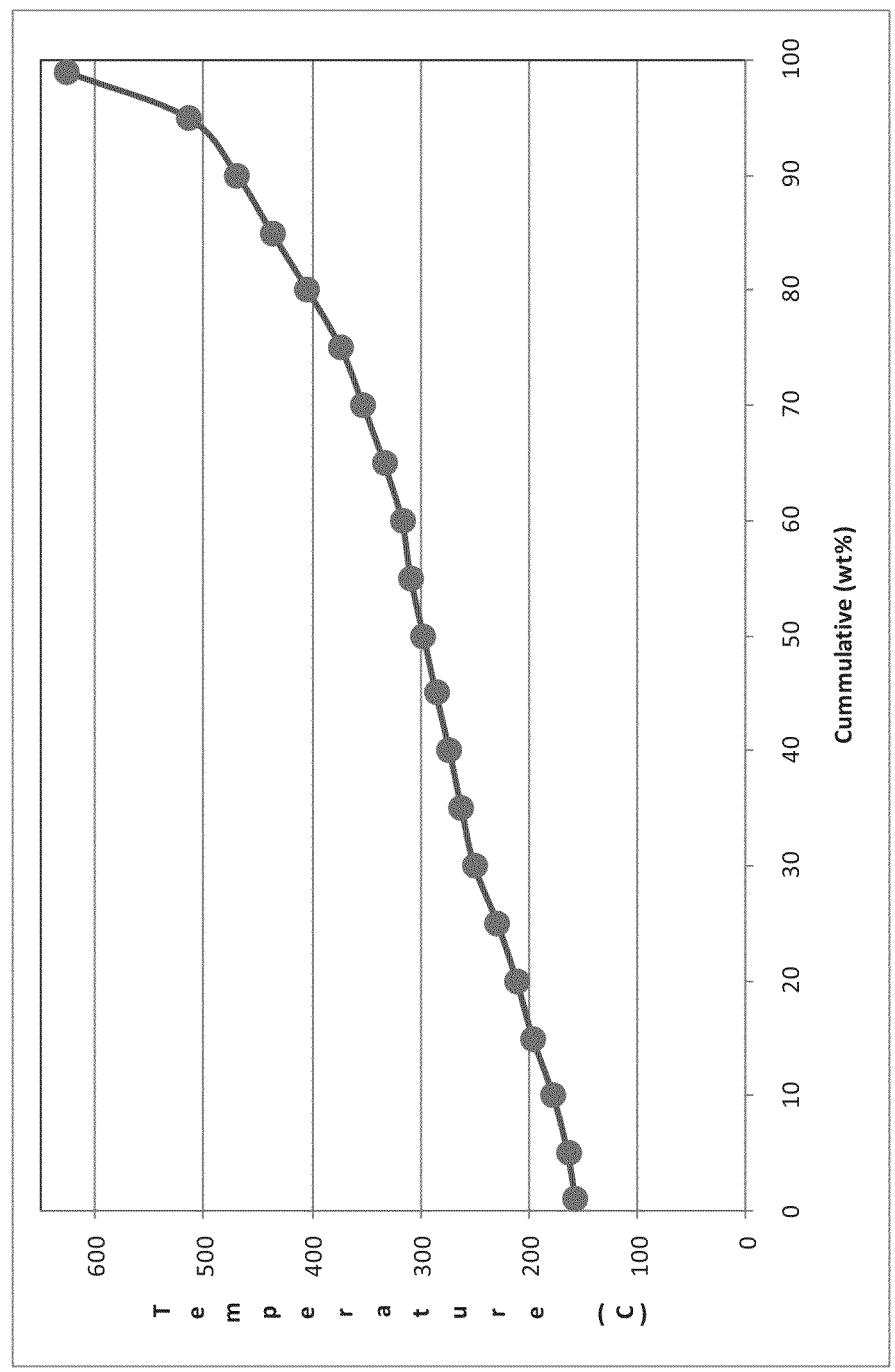
FIG. 6 shows a plot of the high temperature simulated distillation curve of fractional catalytic pyrolysis oil produced from hybrid poplar wood.

The simulated distillation curve of the FCP oil is shown in FIG. 6. The cumulative curve shows that the entire FCP oil could be distilled without char formation. Conventional rapid biomass pyrolysis oils are difficult to distill and in most cases they form char after 100 C as we experienced in our laboratory studies. On the contrary, the FCP oils were easily distilled using HSTD as well as at atmospheric condition using conventional distillation. The yields of distillates fractions from the simulated distillation of the FCP oils are shown in Table 5. The fraction classified as middle distillates was the largest (46.5%) which could be potentially processed in diesel or heating oil hydrotreater in a petroleum refinery. The heavy naphtha fraction which was the lowest amount (21.5%) could be processed in a naphtha hydrotreater in a petroleum refinery. The ability to distill the FCP oils also shows that FCP oils are very stable and could be potentially processed in conventional petroleum refinery.

TABLE 5

Distillate fractions of High temperature simulated distillation of FCP oil

| Boiling range | Fraction (wt %) |
|---|---|
| ≤220° C.(430° F.) (heavy naphtha) | 21.5 |
| 220-443° C.(430-650 F.) middle distillate (diesel and heating oil) | 46.5 |
| >443° C.(>650° F.) fluid catalytic cracking (FCC) unit feed. | 32 |

Example 3

Multi-Catalyst Pyrolysis Experiments

The goal of the multi-catalyst experiment was to load two catalysts into the fluidized bed reactor and fluidize them independently because of differences in their densities and particle sizes. The independently fluidizing catalysts will catalyze different reactions and improve the quality and stability of the pyrolysis oil products. Because the sand is denser than the FCC and other catalysts, the sand fluidizes independent of the other catalysts. These fluidization regimes were initially demonstrated in a cold flow pyrex glass fluidization reactor.

Following the cold flow experiments, the reactions were conducted in a single stage fluidized bed pyrolysis reactor using hybrid poplar wood samples. The hybrid poplar wood samples were ground in a Wiley mill until all the material passed through a 1 mm mesh screen. The elemental composition of the poplar wood is shown in Table 6. Proprietary fluid cracking catalysts (FCC) were supplied by BASF Inc. and were labeled VPI4, VPI5, VPI6, MBC, and BASF were investigated (Table 7). These catalysts, their combinations, and combinations with sand were investigated in the fluidized bed pyrolysis of the hybrid poplar wood.

TABLE 6

Composition of hybrid poplar wood used for the pyrolysis studies

| Elemental Composition (wt %) | Hybrid polar wood |
|---|---|
| C | 49.09 |
| H | 5.29 |
| N | <0.5 |
| O | 44.76 |
| S | 0.05 |
| Cl | <97 ppm |
| Ash | 0.862 |

TABLE 7

List of catalysts studied

| Catalyst | Zeolite content (%) |
|---|---|
| VPI-1 | 10% zeolite |
| VPI-2 | 20% zeolite |
| VPI-3 | 30% zeolite |
| VPI-4 | 40% zeolite |
| VPI-5 | 40% zeolite |
| VPI-6 | ZSM-5 |
| VPI-7 | 0% zeolite |

Pyrolysis Experiments

The fractional catalytic pyrolysis was carried out in a bench-scale fluidized bed pyrolysis reactor unit which was comprised of a K-Tron volumetric feeder, 50-mm bubbling fluidized bed reactor equipped with a porous metal gas distributor, hot gas filter, two chilled water condensers, an electrostatic precipitator and a packed column. The reactor was externally heated with a three-zone electric furnace. 150 g of poplar wood was pyrolyzed with 150 g of each catalyst in an hour. Nitrogen gas was used to fluidize each catalyst. The summary of the pyrolysis conditions are shown in Table 8 for the different catalysts.

TABLE 8

Fractional catalytic pyrolysis experimental conditions

| Pyrolysis Medium | Amount (%) | Average Temperature (° C.) | Total gas flow rate (L/min) | Weight hourly space velocity (WHSV) | Remarks |
|---|---|---|---|---|---|
| VPI-5 | 100 | 525 | 3.5 | 1.0 | |
| VPI-4 | 100 | 500 | 3.5 | 1.0 | |

TABLE 8-continued

Fractional catalytic pyrolysis experimental conditions

| Pyrolysis Medium | Amount (%) | Average Temperature (° C.) | Total gas flow rate (L/min) | Weight hourly space velocity (WHSV) | Remarks |
|---|---|---|---|---|---|
| BASF | 100 | 460 | 3.5 | 1.0 | |
| MBC & VPI-6 | 62.5/37.5 | 475 | 10.5 | 0.75 | The reactor bed had VPI-6 on top of the MBC |
| VPI-4 & VPI-6 | 62.5/37.5 | 475 | 3.5 | 0.75 | The reactor bed had he VPI-6 on top of the VPI-4 |
| VPI4 & SAND | 60/40 | 475 | 16.5 | 0.75 | The reactor bed had the VPI4 on top of the sand |
| VPI-5 & WGS | 85/15 | 505 | 3.5 | 1.0 | VPI-5 and WGS were mixed together in the bed |
| MBC&BASF | 62.5/37.5 | 475 | 10.5 | 0.75 | The reactor was filled with BASF on top of MBC |
| SAND | 100 | 460 | 16.5 | — | |

Analysis of Pyrolysis Oils

The pHs were measured using an Accumet pH Meter and F-55500-10 Accumet pH probe (Cole-Parmer Instrument Company, Vernon Hills, Ill.). The pH data were obtained after 5-10 min stabilization of the mechanically stirred oil.

The kinematic viscosity of the freshly produced oils were measured at 40° C. with a Cannon-Fenske viscometer according to ASTM D 445 method in a water bath equipped with Fisher Scientific model 730 lab liquid heater.

A Metrohm 701KF Titrino (Brinkmann Instruments, Inc, N.Y,) and a 703 titration stand setup were used for the Volumetric Karl Fischer titration. Hydranal® Composite 5 reagent was used as titrant. About 50 ml of methanol was placed in the titration vessel and conditioned. About 60-100 mg of oil sample was loaded into a hypodermic plastic syringe and weighed. The sample was injected into the titration solvent and the syringe was weighed again. The water content was titrated volumetrically and the resulting mass was recorded.

The evolved gases were analyzed online and also sampled at intervals using gas bags and for off-line analysis. The gases were analyzed using an SRI gas chromatograph (SRI 8610 C Multiple Gas Analyzer#2) equipped with Hayesep-D column, a methanizer, and a flame ionization detector. The gases were identified by comparing their retention times with those of authentic standards.

Carbon-13 nuclear magnetic resonance spectrometry ($^{13}C$-NMR)— About 1.5 g of oil was dissolved in 1.0 ml of dimethyl sulfoxide (DMSO) and 50 µl of tetramethylsilane (TMS) in a 5 mm sample tube. The $^{13}C$-NMR spectra were recorded on a Varian Unity 400 MHz NMR spectrometer. The observing frequency for the $^{13}C$ nucleus was 100.58 MHz. The pulse width was 9.6 µs, the acquisition time was 1.36 s, and the recycle delay was 1 s. The spectra were obtained with 3000 scans and a sweep width of 25.0 MHz.

Cracking of biooils and standard Gulf Coast FCC Feed— The cracking experiments were conducted by BASF Inc. researchers in their Advanced Catalyst Evaluation unit (ACE). This is a standard protocol used in evaluating all petroleum feedstocks for their crackability in an FCC unit. The wood oils from VPI4 & Sand, Steamed VPI4 and BASF were blended with standard Gulf Coast FCC feed (gas oils) in a ratio of 15 wt % pyrolysis to 85 wt % gas oil. The blends were cracked over standard ECat in the ACE unit. In addition, the gas oil was also cracked alone for comparison.

Ultimate analysis of some stable oils—Some of the stable biomass pyrolysis oils were sent to Galbraith Analytical Laboratory Inc. for elemental compositional analysis.

Results

Figure 7:
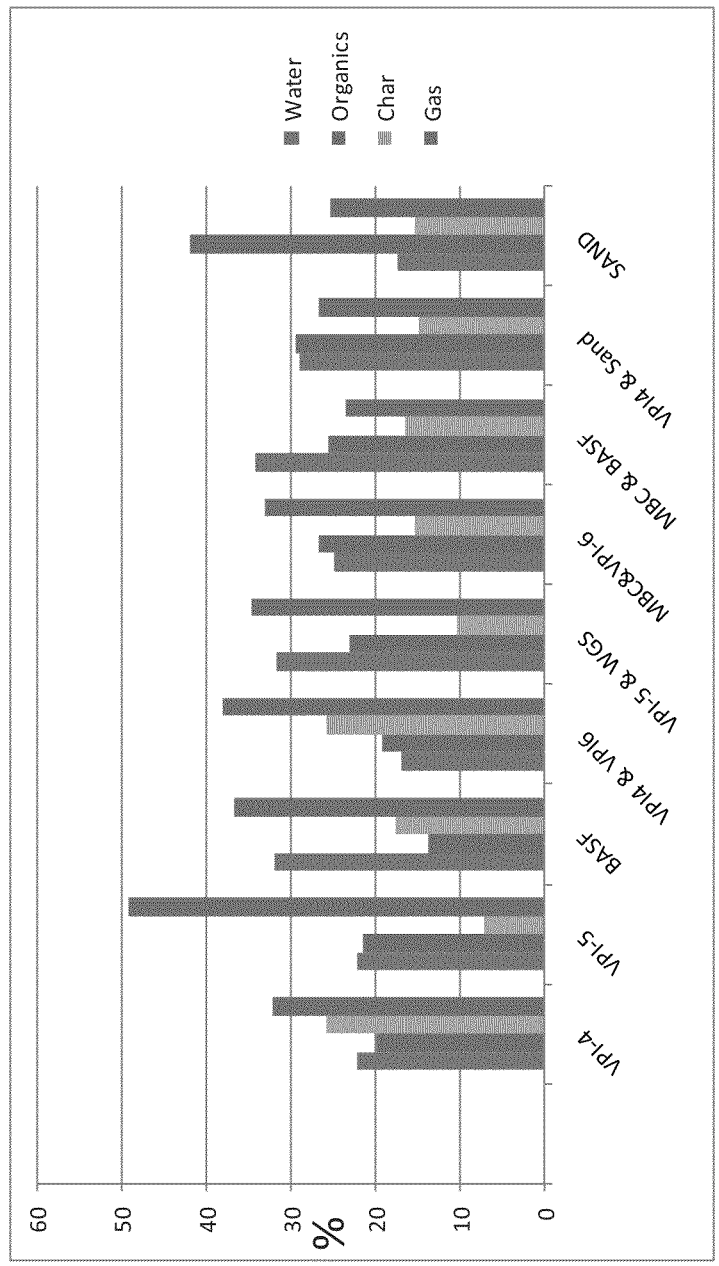
FIG. 7 shows a plot of pyrolysis products distribution using various catalysts.

The yields of various pyrolysis products are shown in Table 9 and FIG. 7. All the oils had relatively low pH and were quite viscous. The distribution of the pyrolysis products did not follow any specific trend. The combination catalysts appeared to produce less gas and less char than the single catalysts. All catalysts produced less organic fraction than the sand. All catalysts also produced more water than the standard sand medium. Thus, the catalyst converted some of the organic components to water, char and gases.

TABLE 9

Pyrolysis products from various catalyst

| | Product Yield Distribution | | | | ESP Oil properties | | |
|---|---|---|---|---|---|---|---|
| Type of Catalyst | Water (wt. %) | Organics (wt. %) | Char (wt. %) | Gas (wt. %) | Water (%) | pH | Kinematic viscosity (cSt) |
| VPI5 | 22.07 | 21.50 | 7.14 | 49.29 | 5.20 | 2.56 | 105 |
| BASF | 31.93 | 13.84 | 17.61 | 36.62 | 2.90 | 2.53 | 245 |
| VPI-4 | 22.19 | 19.95 | 25.71 | 32.14 | 3.15 | 2.75 | 210 |
| VPI4 & SAND | 28.99 | 29.36 | 14.87 | 26.78 | 2.30 | 2.85 | 135 |
| VPI4 & VPI6 | 16.98 | 19.21 | 25.71 | 38.10 | 3.50 | 2.96 | 190 |

TABLE 9-continued

Pyrolysis products from various catalyst

| | Product Yield Distribution | | | | ESP Oil properties | | |
|---|---|---|---|---|---|---|---|
| Type of Catalyst | Water (wt. %) | Organics (wt. %) | Char (wt. %) | Gas (wt. %) | Water (%) | pH | Kinematic viscosity (cSt) |
| VPI5 & WGS | 31.83 | 23.13 | 10.40 | 34.64 | 3.42 | 2.98 | 215 |
| MBC & BASF | 34.24 | 25.63 | 16.57 | 23.57 | 3.48 | 2.98 | 220 |
| MBC & VPI6 | 24.78 | 26.70 | 15.33 | 33.19 | 3.85 | 3.43 | 170 |
| SAND | 17.38 | 41.95 | 15.33 | 25.33 | 2.95 | 2.60 | 285 |

$^{13}$C-NMR Analysis of Pyrolysis Oils

The $^{13}$C-NMR spectra of the biomass catalytic pyrolysis oils are shown in FIGS. 9 through 14. With the exception of the MBC & VPI6 combination catalyst (FIG. 12), all the spectra showed significant decrease in the carbohydrate decomposition products (60-105 ppm) relative to oils produced from silica sand. The relative decrease in the intensity of the carbohydrate decomposition product peaks was different for each catalyst. In the case of the MBC & VPI6 combination, the carbohydrate decomposition products peak appeared to be as intense as those produced on the sand.

There were also relative increases in the intensities of the peaks in the aromatic hydrocarbons region (105-160 ppm). The relative intensities of the peaks also varied with each catalyst. In most catalysts, the acetic acid peaks at 21 ppm and 172 ppm were intense except in the case of MBC & VPI6 catalytic pyrolysis oil (FIG. 12) where the intensities of these complementary peaks were considerably reduced. For the MBC &VPI6 catalyst, the pH of the oil was slightly higher than those from the other oils perhaps because of the loss of some of the acetic acid.

Another interesting feature of the spectra was the methoxyl carbon peak at 56 ppm. For most catalysts, the methoxyl peak appeared to be reduced, however in the case of the MBC & VPI6 combination catalyst, this peak appeared to have increased in intensity suggesting that there was either alkylation of the aromatic rings or there was minimal demethoxylation of the phenolic compounds. This phenomenon requires further detailed investigation.

High Temperature Distillation of Pyrolysis Oils.

Figure 8:
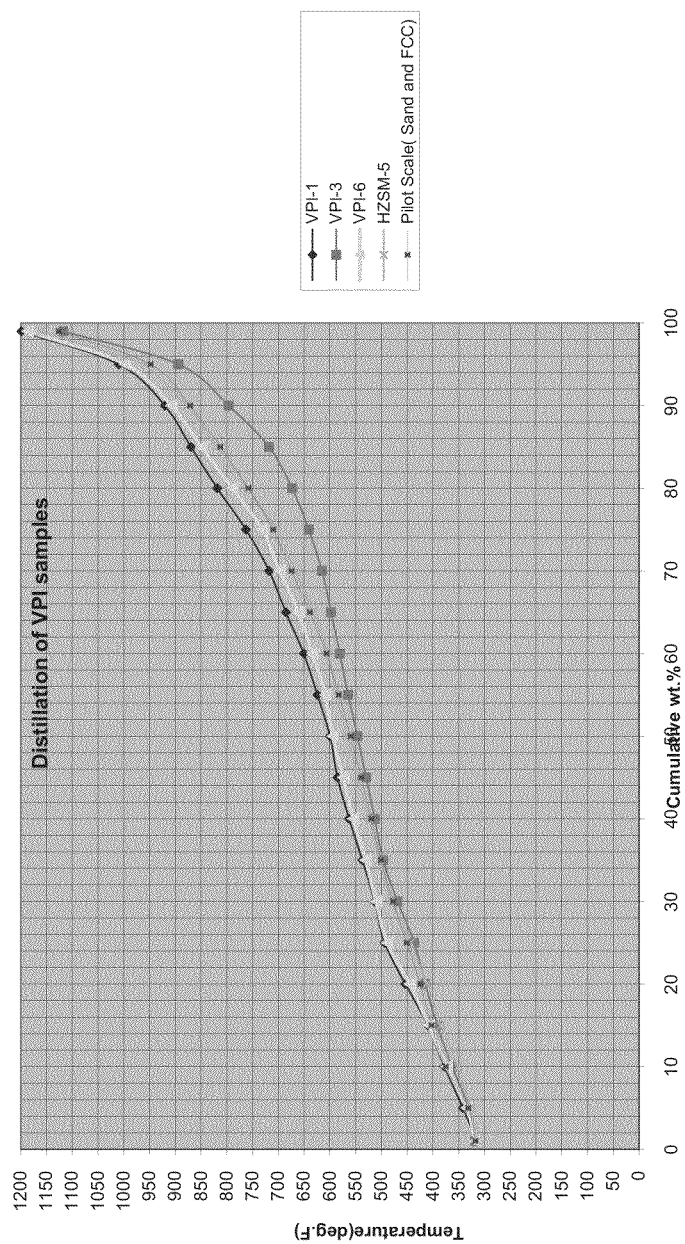
FIG. 8 shows a plot of high temperature simulated distillation of some hybrid poplar factional catalytic pyrolysis oil.
Figure 9:
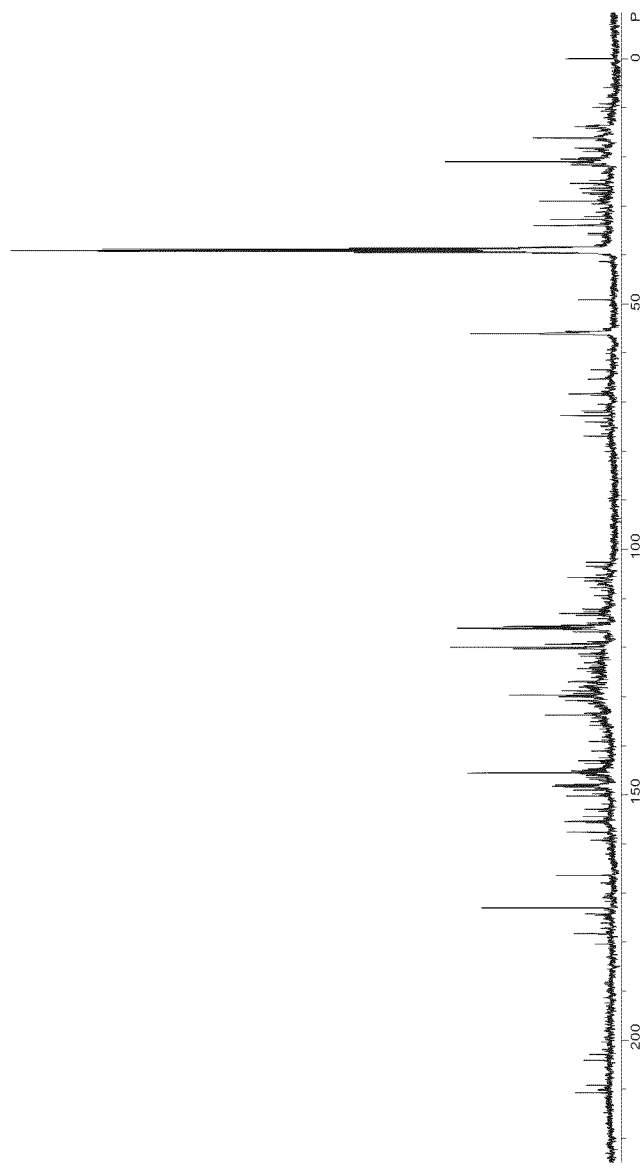
FIG. 9 shows the $^{13}$C-NMR spectrum of pyrolysis oil produced using VPI4 catalyst.
Figure 10:
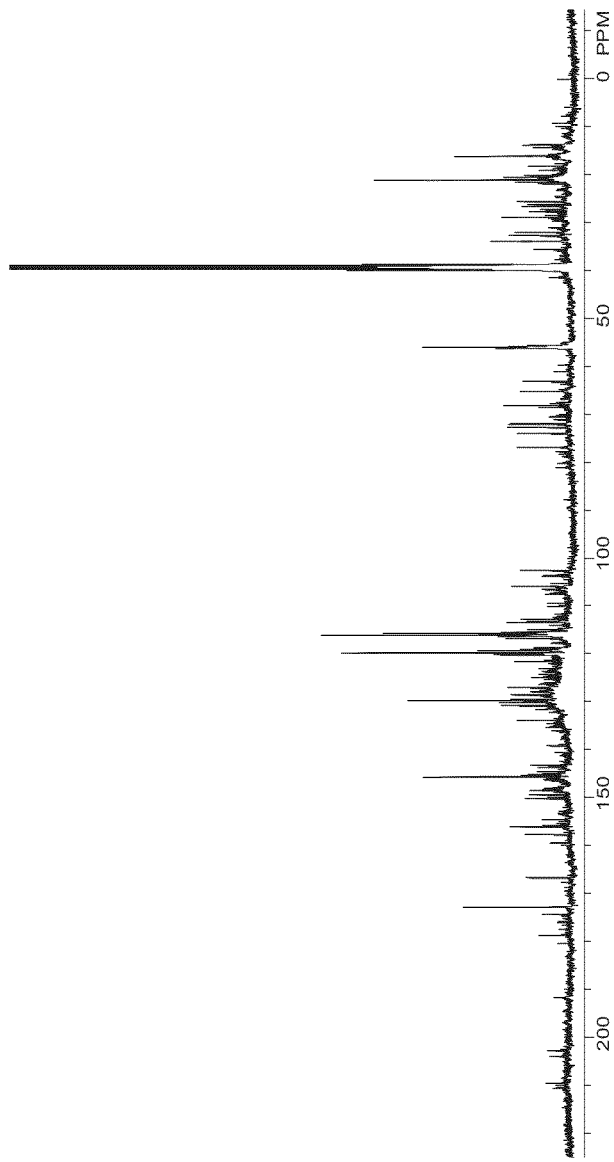
FIG. 10 shows the $^{13}$C-NMR spectrum of pyrolysis oil- produced using VPI5 catalyst.
Figure 11:
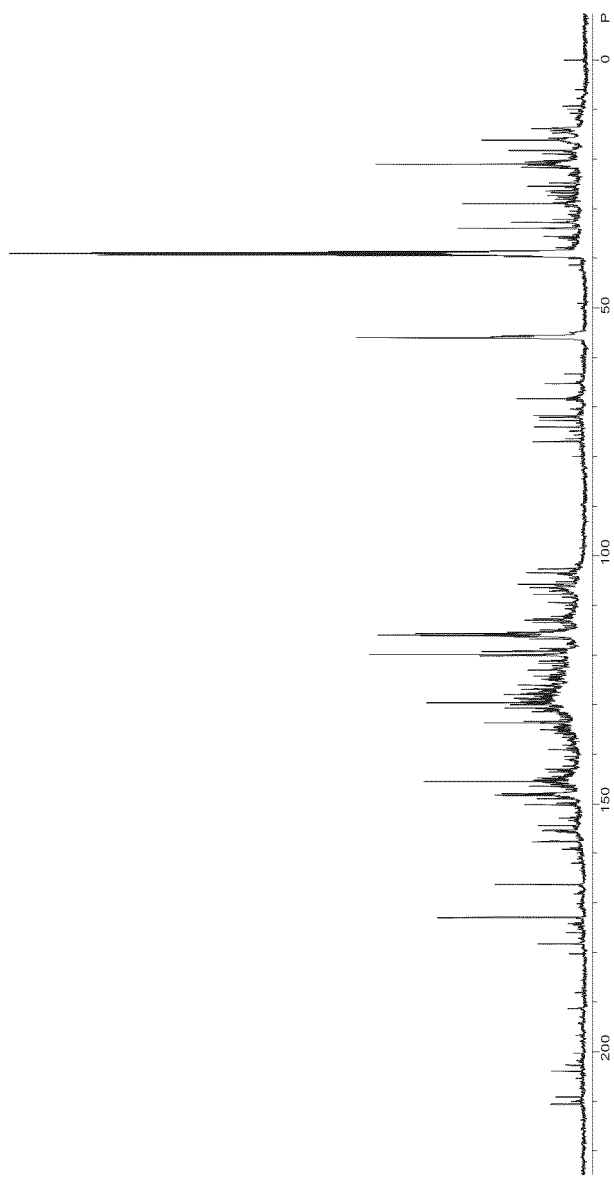
FIG. 11 shows the $^{13}$C-NMR spectrum of pyrolysis oil produced using BASF catalyst.
Figure 12:
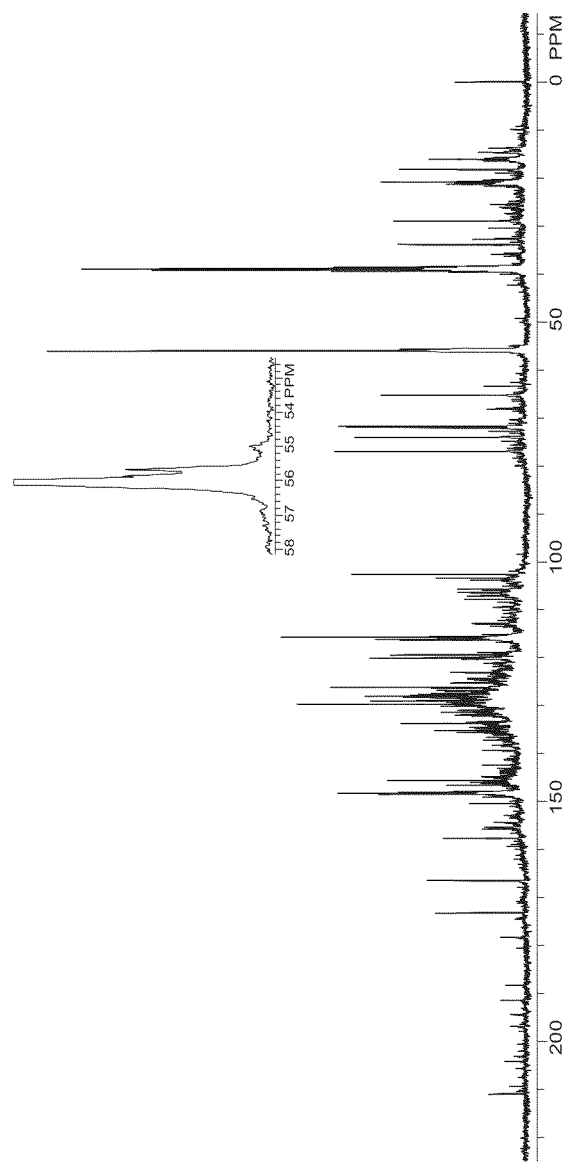
FIG. 12 shows the $^{13}$C-NMR spectrum of pyrolysis oil produced using MBC & VPI6 combination catalysts.
Figure 13:
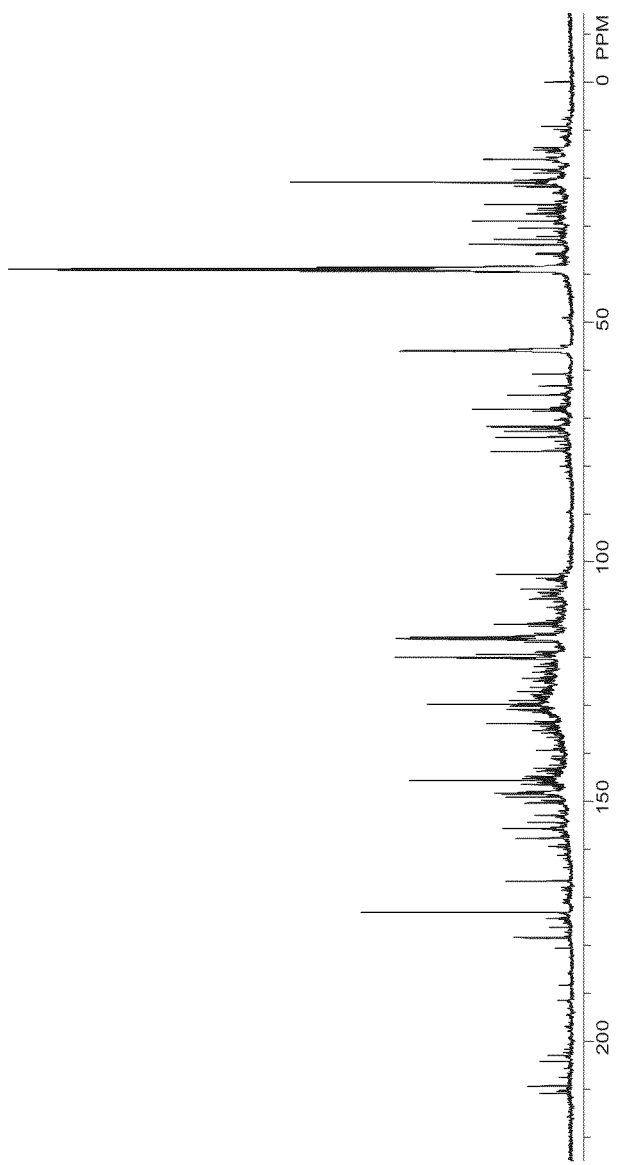
FIG. 13 shows the $^{13}$C-NMR spectrum of pyrolysis oil produced using VPI4 & VPI6 combination catalysts.
Figure 14:
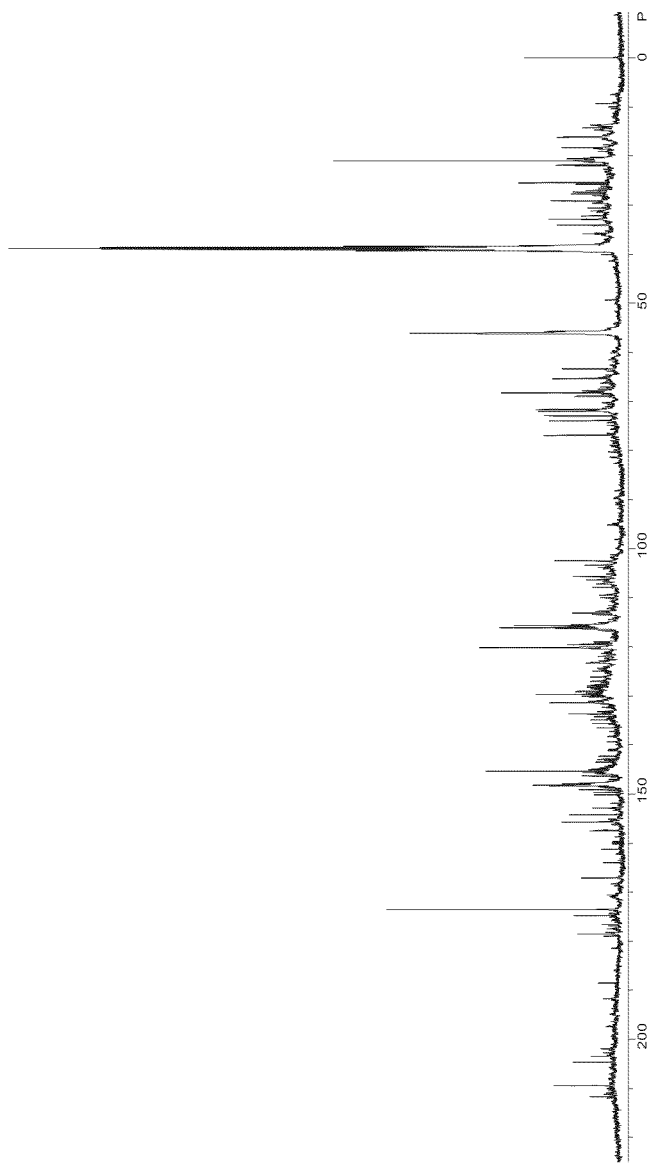
FIG. 14 shows the $^{13}$C-NMR spectrum pyrolysis oil produced using VMS & WGS combination catalysts.

The HTSD data of the pyrolysis oils are shown in Table 10. To the best of our knowledge this is the first time that it has been demonstrated that pyrolysis oils could be completely distilled without forming char. The data in FIG. 8 clearly shows that 100% of the pyrolysis oil could be distilled. It is interesting to note that various catalysts have different effects on the distribution of the distillate fractions. It is also interesting to note that although the VPI series of catalysts oils had higher viscosities and lower pH than the HZSM5 oils, they were all distillable and their distillation curves were similar.

TABLE 10

Distillate fractions of various pyrolysis oils. All catalysts were not steamed

| Catalyst I.D. | VPI-1 | VPI-3 | VPI-6 | HZSM-5 | FCC | Disposition |
|---|---|---|---|---|---|---|
| 430° F. minus (heavy naphtha)(wt. %) | 17.5 | 21.5 | 17.5 | 21.5 | 21.5 | Naphtha Hydrotreater |
| 430-650° F. (middle distillate)(diesel and heating oil)(wt. %) | 42.5 | 57.5 | 45.5 | 46.5 | 45.0 | Diesel or Heating Oil hydrotreater |
| 650+° F. (FCC unit feed)(wt. %) | 40 | 22.5 | 37 | 32 | 33.5 | FCC feed hydrotreater |

Cracking of Pyrolysis Oils

We demonstrated that we could produce stable distillable pyrolysis oils that did not increase in viscosity during storage, using the VPI4 & sand combination catalyst as well as BASF catalyst. We thus conducted further tests on the crackability of these oils using standard petroleum industry protocols for assessing the crackability of the oils. Thus, blends of 15 wt % pyrolysis oil and 85 wt % standard Gulf Coast FCC feed (gas oils) were evaluated in the ACE unit. The cracking data are shown in Table 11. The crackability of the stable pyrolysis oils were assessed by determining the reduction in the conversions of the blends relative to the unblended standard gas oil. A reduced conversion indicated that pyrolysis oils did not have equivalent crackability. The conversion achieved with the 15/85 blend was equivalent to 100% gas oil (Table 11).

TABLE 11

Cracking products distribution of 15 wt % pyrolysis oils and 85 wt % gas oil blends

| Product | Standard 4350 (gas oil) | VPI4 & Sand | Steamed VPI4 | VPI Stable Oil |
|---|---|---|---|---|
| H2 | 0.61 | 0.53 | 0.44 | 0.56 |
| Total C2 | 2.98 | 2.99 | 2.92 | 2.94 |
| LPG | 16.00 | 16.19 | 16.00 | 15.95 |
| Gasoline | 43.97 | 44.01 | 44.44 | 44.35 |
| LCO | 17.06 | 16.93 | 17.23 | 17.23 |
| HCO | 12.94 | 13.07 | 12.77 | 12.77 |
| Coke | 7.06 | 6.81 | 6.64 | 6.76 |
| Conversion | 70.00 | 70.00 | 70.00 | 70.00 |
| Cat/oil | 6.00 | 6.00 | 5.96 | 5.81 |

The coking tendency of the pyrolysis oils also appeared to be slightly better than that of the standard gas oil. Thus, these pyrolysis oils were not only stable and distillable, but they could also be cracked into various fuel components. These oils could be used as premium FCC feed in the petroleum industry or they could be used as blends with standard gas oil for cracking into various fuel products. This is the first time to our knowledge that pyrolysis oils have been demonstrated to be crackable or co-cracked with standard gas oil. However, the pHs of these oils were acidic and have relatively high TAN numbers.

Ultimate Composition of Stable Pyrolysis Oils

The ultimate composition of one the stable pyrolysis oils is shown in Table 12. The ash content of this oil was extremely low because of the hot gas filtration method employed for char separation instead the conventional cyclone method. The carbon and oxygen contents were relatively high.

TABLE 12

Composition of stable biomass pyrolysis oil produced hybrid poplar wood

| Analysis | Composition |
| --- | --- |
| Ash | <0.05% |
| Carbon | 66.33% |
| Hydrogen | 6.19% |
| Oxygen by difference | 27.48% |
| Chlorine | <20 ppm |
| Sulfur | <0.05% |
| Nitrogen | <0.5% |
| Ka Fischer water | 13.2% |

High Temperature Simulated Distillation (HTSD) of Biocrude Oils

Simulated distillation is a gas chromatography (GC) method that separates individual hydrocarbon components in the order of their boiling points, and is used to simulate the laboratory-scale physical distillation procedure known as true boiling point distillation. The separation is accomplished with a non-polar chromatography column using a gas chromatograph equipped with an oven and injector that can be temperature programmed. A flame ionization detector (FID) is used for detection and measurement of the hydrocarbon eluents. The result of the simulated distillation can provide a quantitative mass fraction yield as a function of boiling point of the hydrocarbon components of the sample. The chromatographic elution times of the hydrocarbons are calibrated to the atmospheric equivalent boiling point of the paraffins reference material. The simulated distillation method ASTM D2887 (ASTM International) covers the boiling range of 55-538° C. (100-1000° F.) which corresponds to the n-alkanes of chain length about C5-C44.

The high-temperature simulated distillation (HTSD) method covers the boiling range of 36-750° C. (97-1382° F.) which corresponds to the n-alkane range of about C5-C120. A key difference between ASTM D2887 and HTSD is the ability of the latter technique to handle residue-containing samples (i.e. material boiling>538° C., (1000° F.)). The biocrude oils and Standard #4350 Gas oil were also characterized using the HTSD method. The HTSD was performed by the BASF Inc. analytical laboratory.

The cracked products and the raw biocrude oil were characterized using carbon-13 nuclear magnetic resonance ($^{13}$C-NMR) spectroscopy and Fourier transform infrared (FTIR) spectroscopy.

Figure 20:
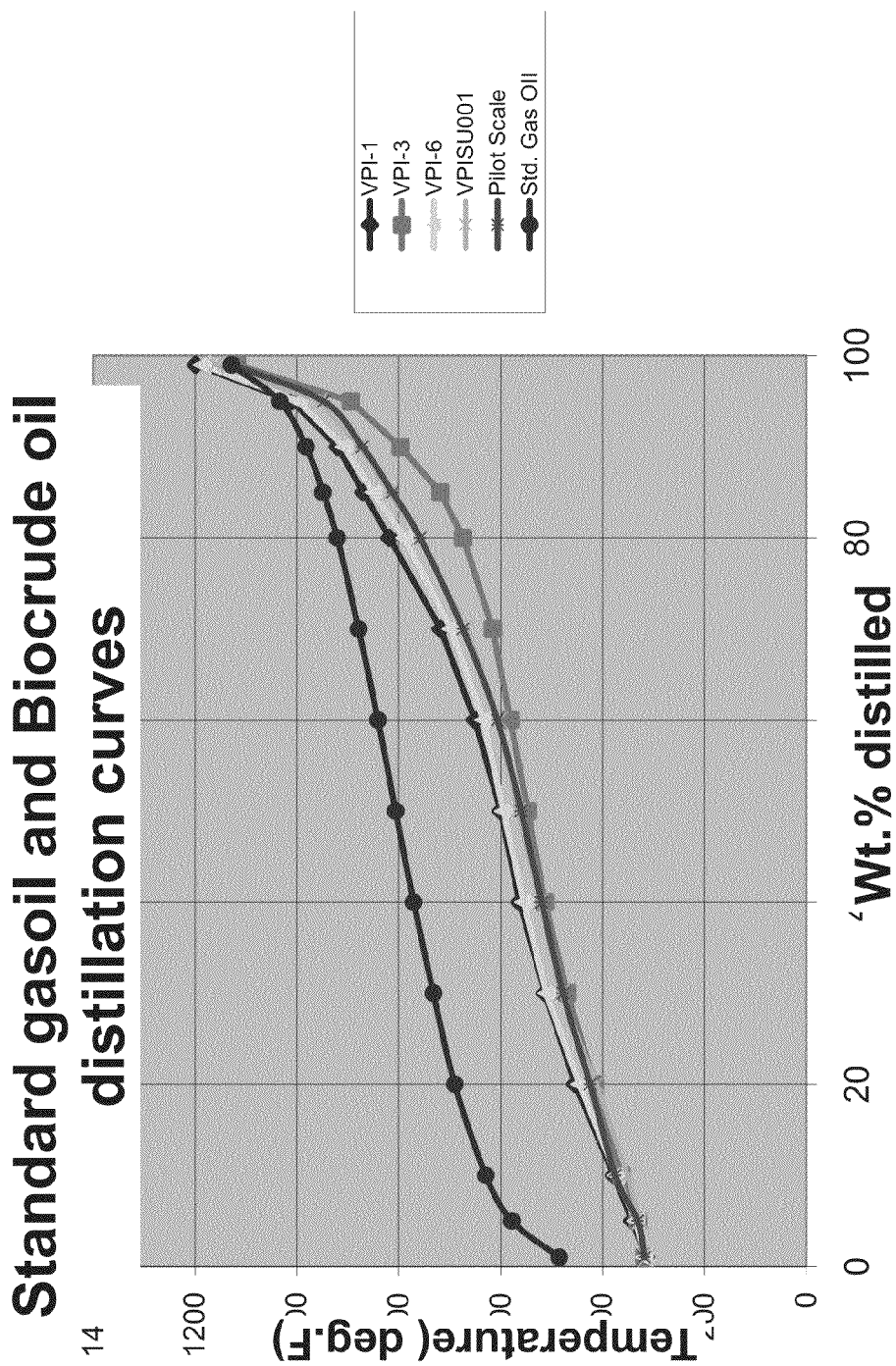
FIG. 20 shows a plot of the high temperature simulated distillation curves of Standard #4350 Gas oil and biocrude oils produced using different catalysts.

The high temperature simulated distillation curves of the biocrude oils and Standard #4350 Gas oil are shown in FIG. 20. The cumulative curve showed that the entire biocrude oils could be distilled without char formation. The biocrude oils were easily distilled using HTSD as well as at atmospheric condition using conventional laboratory-scale physical distillation. The yields of distillates fractions from the simulated distillation of the biocrude oil were previously reported [39] and are not repeated here. The ability to distill the biocrude oil also suggested that biocrude oils were very stable and could be potentially processed in a conventional petroleum refinery.

The initial boiling point of the Standard #4350 Gas oil (FIG. 20) was higher than that of the biocrude oils because the originating refinery fractionated it to remove most of the material boiling below 300° C. The biocrude oils contained about 60% of material boiling below 300° C., and when normalized on a 300+° C. basis, the two feedstocks look quite similar. This similarity in the HTSD curves suggested that the two oils could be potentially co-cracked as blends in FCC units.

Fluid Catalytic Cracking (FCC) of Standard Gas Oil and Pyrolysis Oils Blend

The purpose of the tests was to evaluate whether the pyrolysis oils (biocrude oils) will influence or suppress the cracking of the Standard #4350 Gas oil and result in the formation of more coke or undesirable products as reported by other researchers for conventional pyrolysis oil. Standard #4350 Gas oil was cracked at 538° C. (1000° F.) and compared with blends of Standard #4350 Gas oil and biocrude oils. The cracked products from the Standard #4350 Gas oil and blends with 15 wt % biocrude oils are shown in Table 13.

TABLE 13

Process conditions and yields of hydrocarbon fractions obtained from the co-processing of biocrude oil and Standard #4350 Gas oil (15/85) blends and Standard #4350 Gas oil

| Parameter | Standard #4350 Gas oil | 15/85 Blend | 15 wt % Biocrude + 85 wt % Standard #4350 Gas oil | | | | |
| --- | --- | --- | --- | --- | --- | --- | --- |
| Catalyst (g) | 9 | 9 | 9 | 9 | 9 | 9 | 9 |
| Activity | 2.33 | 2.33 | 2.81 | 2.48 | 2.48 | 2.27 | 1.96 |
| WHSV | 8 | 8 | 8 | 8 | 8 | 8 | 8 |
| Cat/oil | 6.00 | 6.00 | 9 | 7 | 5.81 | 5 | 4 |
| H2 (wt %) | 0.61 | 0.56 | 0.53 | 0.57 | 0.58 | 0.56 | 0.55 |
| Total C2− (wt %) | 2.98 | 2.94 | 2.69 | 2.55 | 2.44 | 2.32 | 2.13 |
| LPG (C3&C4) (wt %) | 16.00 | 15.95 | 17.82 | 16.80 | 16.39 | 15.64 | 14.35 |
| Gasoline (C5-220° C.) (wt %) | 43.98 | 44.35 | 43.78 | 43.63 | 44.89 | 44.71 | 43.92 |
| LCO (220-340° C.) (wt %) | 17.06 | 17.23 | 15.51 | 16.16 | 16.84 | 17.64 | 18.97 |
| HCO (>340° C.) (wt %) | 12.94 | 12.77 | 10.68 | 12.58 | 11.90 | 12.94 | 14.84 |
| Coke (wt %) | 7.06 | 6.76 | 8.97 | 7.69 | 6.94 | 6.16 | 5.22 |
| Conversion (%) | 70.00 | 70.00 | 73.81 | 71.26 | 71.25 | 69.42 | 66.19 |
| HC Matl balance (%) | 100.7 | 98.15 | 96.6 | 97.2 | 98.1 | 99.2 | 101.1 |

The product yields at 70% constant conversion ((100−(LCO+HCO)) from catalytic cracking of Standard #4350 Gas oil showed relatively low coke yield. The hydrogen yield was 0.6 wt % and the gasoline yield was 43.97 wt %. These yields are typical of commercial straight run gas oil cracking fractions used on a routine basis to evaluate FCC feeds before proceeding with industrial scale cracking.

The blends of Standard #4350 Gas oil and biocrude oils were cracked at several catalyst to oil ratios while maintaining a constant weight hourly space velocity (WHSV) of 8. In the first test, a blend of 15 wt % biocrude and 85 wt % Standard #4350 Gas oil was evaluated and compared with the control (Standard #4350 Gas oil). The first two columns of Table 13 show the results of the tests at 70% constant conversion. It is clear from the data that the blending of the Standard #4350 Gas oil with 15 wt % biocrude did not have any obvious influence on the yield of various cracked fractions, especially the gasoline fraction. This result suggests that at a catalyst to oil ratio of 6, biocrude oil/gas oil blends can be used to produce gasoline with similar yields as petroleum gas oil. If the fuel properties of the blend fraction are similar to that produced from Standard #4350 Gas oil, then this will constitute a true replacement for gasoline produced entirely from petroleum.

The hydrogen and coke yields for the blend and Standard #4350 Gas oil showed considerable differences. During FCC cracking of standard gas oil, hydrogen is usually produced from the cyclization of the straight chain aliphatic hydrocarbons into aromatic compounds. The blend produced 8.2% less hydrogen than the Standard #4350 Gas oil because the biocrude is hydrogen deficient and has about 21% oxygen. If all the oxygen in the biocrude oil were converted into water, it will require 0.098 g hydrogen and therefore the hydrogen yield for the blend should have been 0.51 wt % instead of 0.56 wt %. The higher yield of hydrogen from the blend suggests that some of the oxygen in the biocrude oil was rejected as either carbon monoxide/carbon dioxide or the blend was over-cracked. Our results are consistent with the reported literature data. The consumption of hydrogen in the cracking process was attributed to hydrogen transfer reactions between active species and not due to hydrogenation of the biocrude oil components. Typical hydrogenation processes require high pressures and temperatures and nickel catalysts, but in these studies, the ACE™ unit was operated at ambient pressure and 538° C. Furthermore, the FCC catalyst is not known for hydrogenation.

The coke yield for the blend was 4.2% lower than that from the Standard #4350 Gas oil, which suggests that the biocrude oil retarded or inhibited the coke formation reactions.

The effects of catalyst to oil ratios (Cat/O) were also investigated in our studies and these revealed some interesting results. The data in Table 13 clearly showed that the process was very sensitive to the Cat/O ratio because this ratio affected the catalyst activity and subsequently the product yields and other parameters. The catalyst activity was defined as:

Activity=(100−LCO−HCO)/(LCO+HCO).

Figure 15:
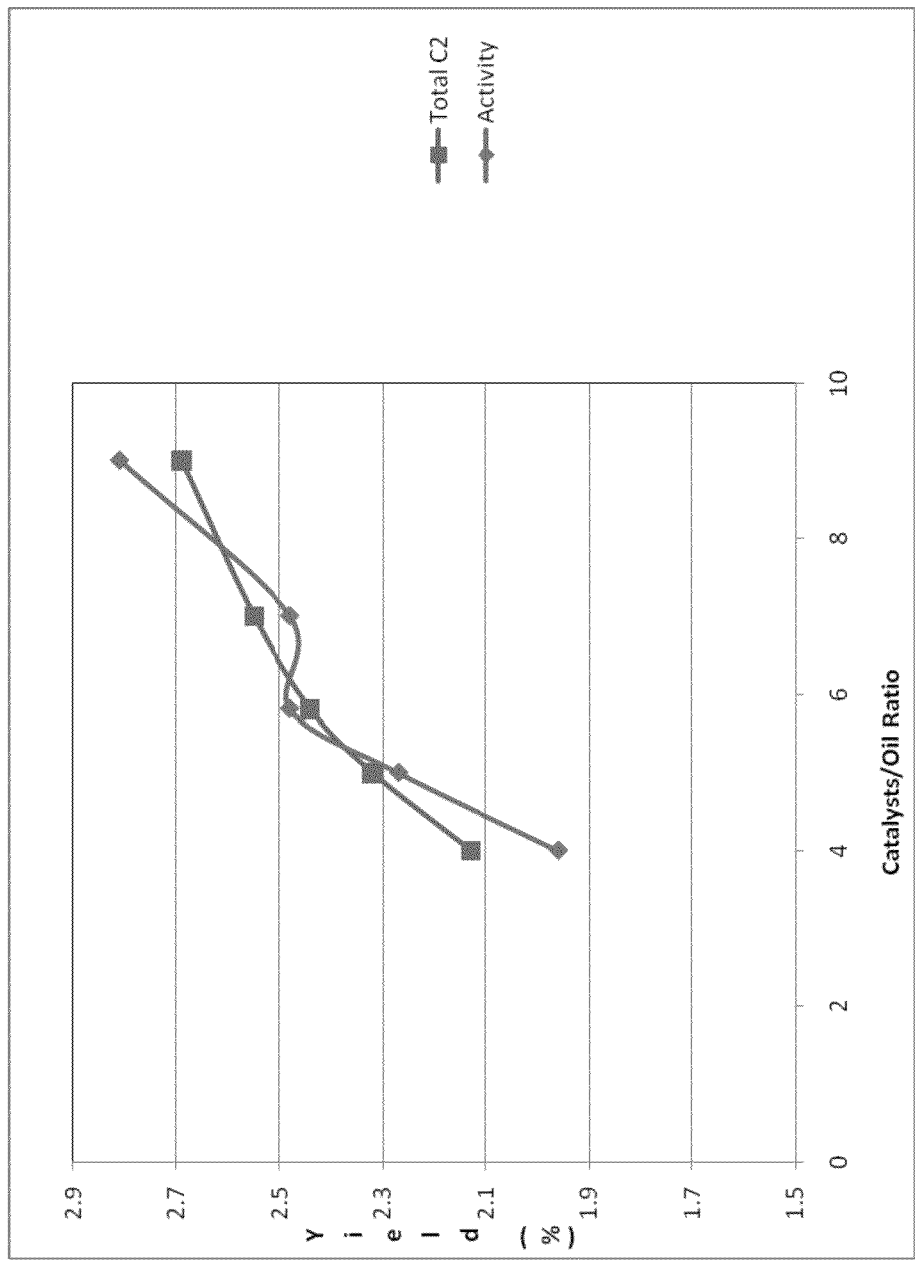
FIG. 15 shows a plot of the influence of catalyst to oil ratios on catalyst activity and yield of total C2-hydrocarbon gases during FCC cracking of biocrude oil/Standard #4350 Gas oil (15/85) blends.

As the Cat/O ratio was decreased, the catalyst activity decreased almost linearly (FIG. 15) and the lowest activity was 2.15 at a Cat/O ratio of 4. The lowering of the catalyst activity due to the decrease in the Cat/O ratio from 9 to 4 reduced the overall conversion by 10.3%. The total C2-gas yield also decreased with decrease in Cat/O ratio and appeared to follow a similar trend as the catalyst activity.

Figure 16:
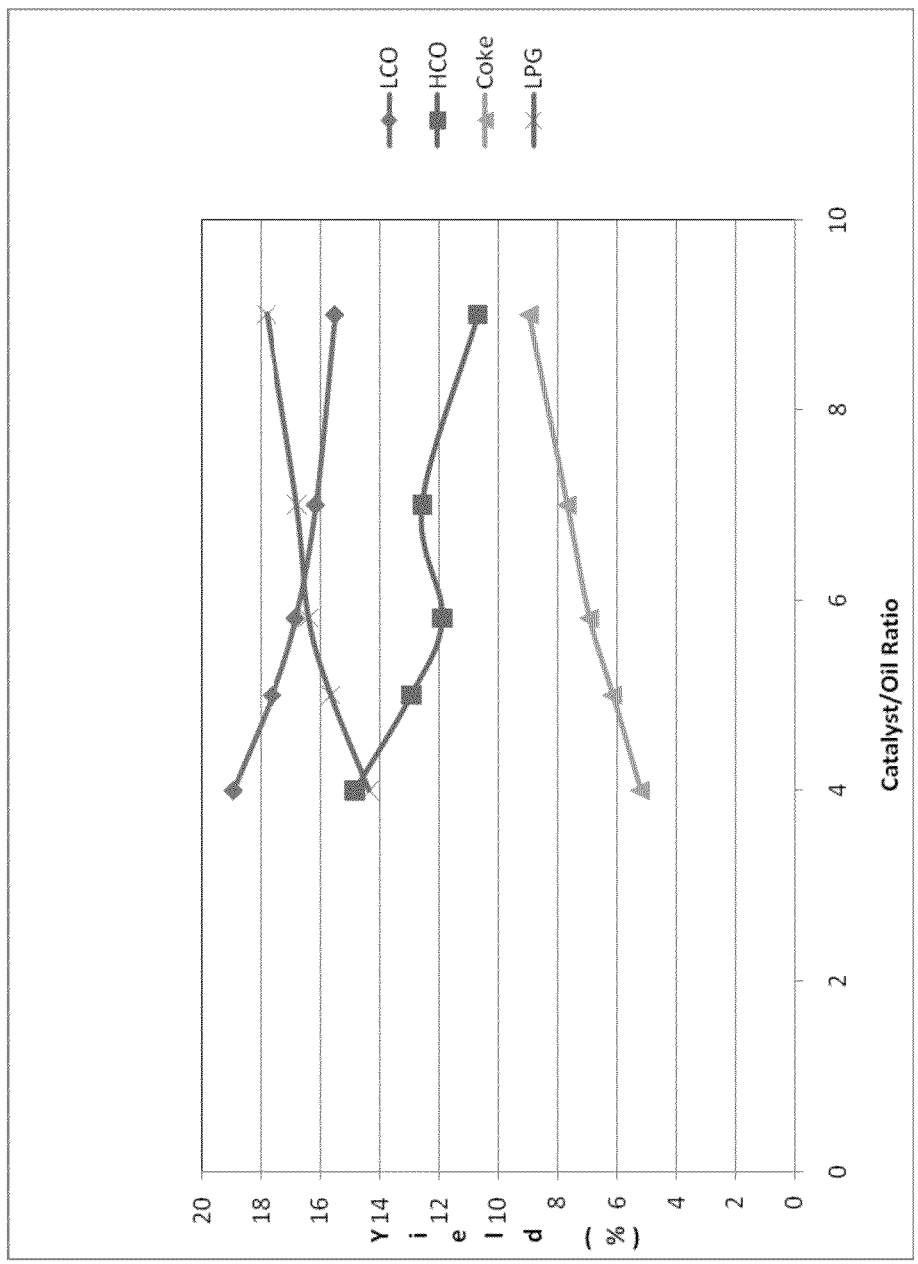
FIG. 16 shows a plot of the influence of catalysts to oil ratio on the yields of LPG, LCO, HCO, and coke during FCC cracking of biocrude oil/Standard #4350 Gas oil (15/85) blends.

The LPG yield decreased by 19.5% when the Cat/O was decreased from 9 to 4 (FIG. 16). The coke yield showed the highest decrease in yield (41.8%) when the Cat/O was varied from 9 to 4 (FIG. 16). As the Cat/O ratio was decreased, the catalyst was less active and therefore could not promote the coke forming reactions. These results are similar to what has been traditionally observed for the cracking FCC feed. A similar trend was observed when the Standard #4350 Gas oil was cracked at different Cat/O ratios (data not shown). Thus, the level of coke formation for this process can be controlled by adjusting the Cat/O ratio. The HCO and LCO yields followed similar trends as the Cat/O ratios were varied (FIG. 16). In both cases the yields increased as the Cat/O decreased. This trend was the reverse of what was observed for the coke, LPG and the Total C2-gases. The increase in yields of the LCO and HCO were attributed to the lower conversion due to the lower catalyst activity.

Figure 17:
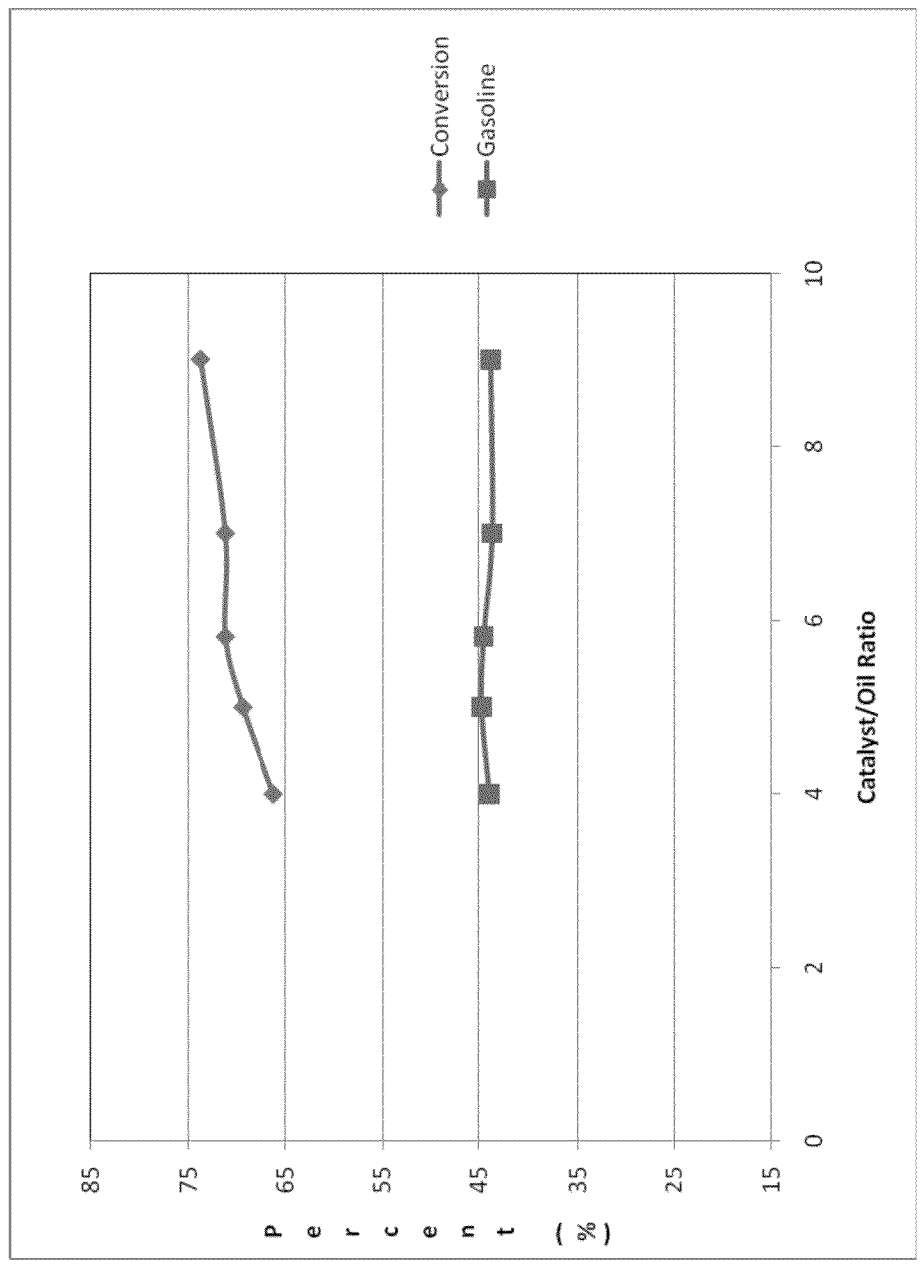
FIG. 17 shows a plot of the influence of catalyst to oil ratio on the gasoline yield and conversion during FCC cracking of biocrude oil/Standard #4350 Gas oil (15/85) blends.

Although most product yields changed with variation of Cat/O ratio, it was very interesting to note that there was minimal change in the gasoline yields with change in Cat/O ratio (FIG. 17). The overall conversion of the feed blend changed with variation of the Cat/O ratio, but this did not affect the gasoline yield significantly. Because of the constant gasoline yield and variation in the coke yield with Cat/O ratio, this provides a method of controlling the coke produced in the processing of these blends.

Chemical Composition of Cracked Standard #4350 Gas Oil and Biocrude Oil Fractions.

Figure 18:
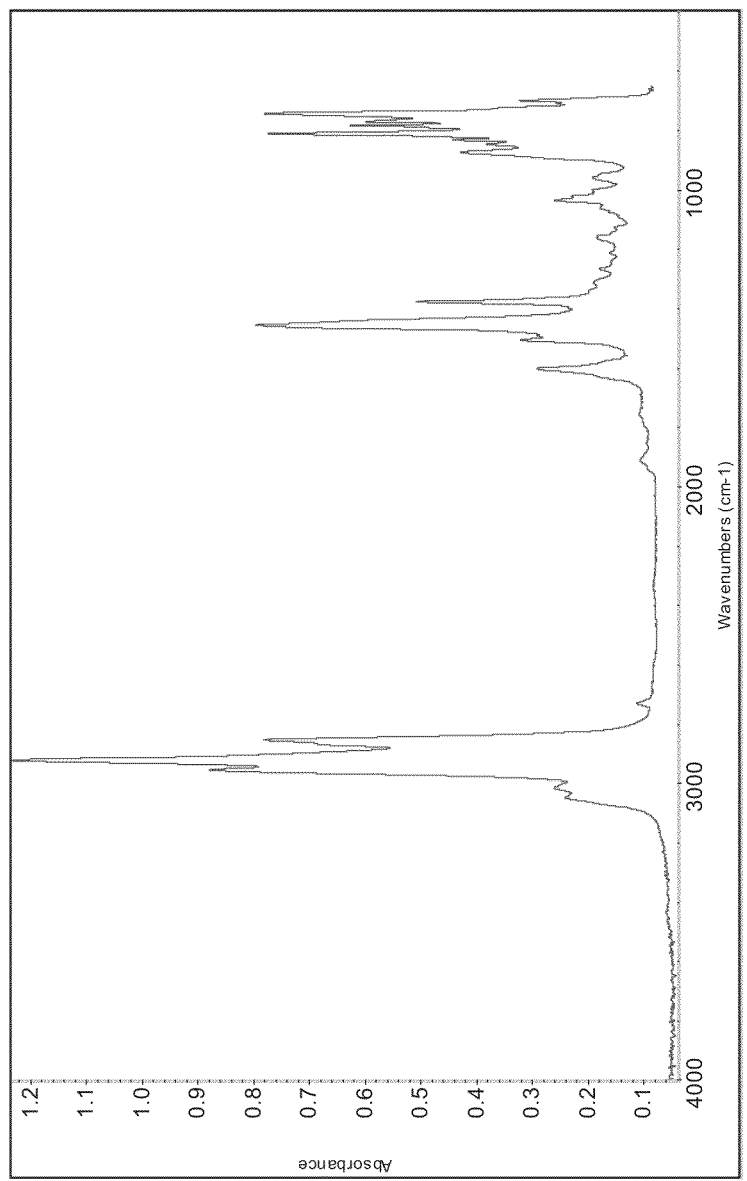
FIG. 18 shows the FTIR spectrum of composite liquid fraction of FCC cracked biocrude oil/Standard #4350 Gas oil (15/85) blend.

The composite liquid fractions of the cracked oils (<480° C.) were analyzed by Fourier transform infrared (FTIR) spectrometry and $^{13}$C-nuclear magnetic resonance ($^{13}$C-NMR) spectroscopy to identify the major functional groups present in the cracked blends. The FTIR spectrum of a typical composite liquid fraction is shown in FIG. 18. The spectrum shows strong CH2, CH3, stretching's of aliphatic and aromatic hydrocarbons at 2854, 2923, and 2955 cm$^{-1}$ and no peak due to OH groups in the 3300 cm$^{-1}$ region. This is interesting because the absence of OH groups suggest that the oxygenated groups associated with phenols and other acidic groups in the biocrude oils were eliminated during the co-cracking of the blends. The spectrum also showed a medium intensity peak at 1605 cm$^{-1}$ due to aromatic benzene ring breathing, indicating the presence of aromatic groups in the composite liquid fraction. The peaks at 1455 and 1375 cm$^{-1}$ due to aliphatic hydrocarbons complement the peaks at 2854, 2923, and 2955 cm$^{-1}$. The oxygenated groups that have peaks between 1030 and 1150 cm$^{-1}$ due to C—O stretching vibrations in levoglucosan and other carbohydrate decomposition products were also not observed in this spectrum. The methoxyl carbon peak associated with lignin decomposition compounds that occurs at 1515 cm$^{-1}$ and the carbonyl carbon peaks due to C=O stretching in ketones, carboxylic acids, and aldehydes that occur between 1700 and 1730 cm$^{-1}$ were also not detected in the spectrum. Thus, it appeared that the composite liquid fraction was a mixture of aromatic and aliphatic hydrocarbons and/or alkylated aromatic hydrocarbons.

Figure 19:
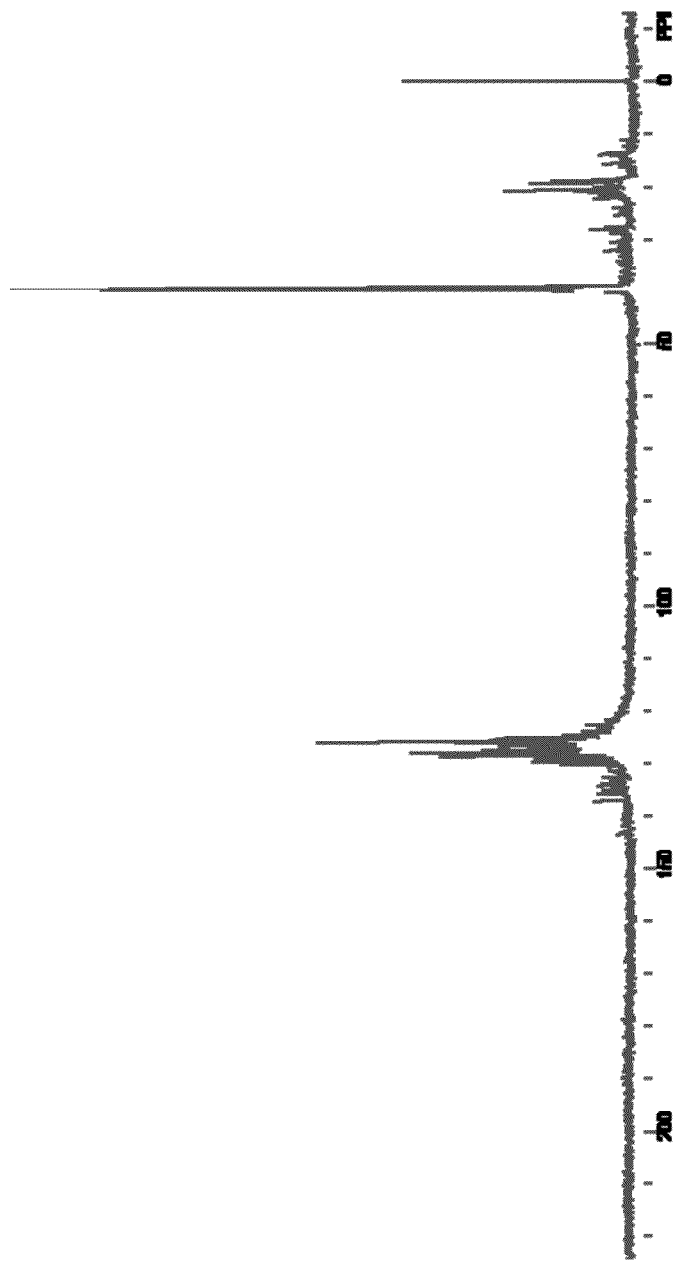
FIG. 19 shows the $^{13}$C-NMR spectrum of composite liquid fraction of co-processed biocrude oil/Standard #4350 Gas oil (15/85) blend.

The FTIR spectral data was corroborated by the $^{13}$C-NMR spectrum (FIG. 19) of the cracking product, which showed two major functional groups present. The peaks from 10 to 40 ppm are due to aliphatic hydrocarbon side chains while the peaks at 120 to 145 ppm are due to aromatic hydrocarbons. Oxygenated groups such as ketones (195-220 ppm), aldehydes (190-200 ppm), and carboxylic acids (170-185 ppm), and carboxylate esters (165-175 ppm) were not detected in this spectrum. The spectrum was also devoid of sugars and other sugar derivatives which resonate in the 60 to 103 ppm region. The methoxyl carbon normally associated with the lignin degradation products which resonates at 55 to 56 ppm was also absent from the spectrum. Thus, on the evidence of the FTIR and $^{13}$C-NMR spectra, we concluded that, perhaps there were hydrogen transfer reactions between the hydrogen generated from the Standard #4350 Gas oil with some of the oxygenated groups in the biocrude oils; these reactions rejected the oxygen as either water or carbon monoxide.

Although the elemental analysis of the biocrude oil showed relatively high oxygen content (Table 12), the data in Table 13 showed that the biocrude oil could be co-cracked. It is interesting to note that contrary to the conventional wisdom that the oxygen content of the bio-oil must be reduced to below 10 wt % to be cracked in FCC units, our data clearly demonstrated that the oxygen content of the bio-oil should not be used as a criteria for crackability of the biocrude oil. We believe that the criterion for processability of bio-oils should be the stability of the oil instead of the oxygen content. The most important criterion should be whether the bio-oil can be distilled without forming solids or whether it can be processed with the HSD method. If the bio-oil meets these criteria, it could be successfully co-processed with standard FCC feeds into fuels compatible with conventionally produced gasoline, heating oil, and heavy fuel oil.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

REFERENCES

1. Agblevor, F. A; Besler S.; Wiselogel A E. Fast pyrolysis of stored biomass feedstocks. *Energy &Fuels* 1995, 9(4), 635-640.
2. Scott, D. S.; J. Piskorz, J. *Can. J. Chem. Eng.* 1982, 60, 666
3. Graham, R. G.; Bergougnou, M. A. Fast pyrolysis of biomass. *J. Anal. Appl. Pyrolysis* 1984; 6, 95-135.
4. Diebold, P J.; Scahill, I Production of Primary Pyrolysis Oils in a Vortex Reactor. In *Pyrolysis Oils from Biomass*, Soltes, E J.; Milne T. A., Eds.; ACS Symposium Series 376; American Chemical Society: Washington D.C. 1988; pp 31-40.
5. Piskorz, J.; Scott, D. S.; Radlein, D. Composition of oils obtained by fast pyrolysis of different woods. In *Pyrolysis oils from biomass: producing, analyzing, and upgrading*, Soltes, E J. and Milne T A, Eds.; ACS Symposium Series 376; American Chemical Society: Washington D.C. 1988; pp 167-178.
6. Elder, T. Effect of process conditions on the yield of pyrolytic products from southern pine. *Wood and Fiber Science* 1984, 16(2), 169-179.
7. Evans, R J.; Milne T. A Molecular characterization of the pyrolysis of biomass. 1. Fundamentals. *Energy & Fuels* 1987, 1(2), 123-137.
8. Font, R.; Marcillia, A; Verdu, E.; Devesa, J. Fluidized-bed flash pyrolysis of almond shells. Temperature influence and catalyst screening. *Ind. Eng. Chem. Prod. Res. Dev.* 1986, 25, 491-496.
9. Maschio, G.; Koufopanos, C.; Lucchesi, A. Pyrolysis, a promising route for biomass utilization. *Bioresource Technology* 1992, 42, 219-231.
10. Besler, S.; Agblevor, F.; Davis, M.; Eddy, F.; Johnson, D.; Wiselogel, A. Fluidized bed Pyrolysis of Terrestrial Biomass Feedstocks. In *Proc. Bioenergy '94, Sixth National Bioenergy Conference*; Western Regional Biomass Energy Program: Golden, Colo. 1994; Vol. I, pp. 43-50.
11. Czernik, S.; Scahill, I; Diebold, J. The production of liquid fuel by fast pyrolysis of biomass. *J. Solar Energy Eng.* 1995, 117, 2-6.
12. Scott, D. S.; Piskorz, J.; Radlein, D. Liquid products from continuous flash pyrolysis of biomass. *Ind. Eng. Chem. Process Design and Dev.* 1985, 24, 581-8.
13. Bohn, M. S.; Benham, C. B. Biomass pyrolysis with entrained flow reactor. *Ind Eng. Chem. Process Design Dev.* 1984, 23, 355-63.
14. Scott, D. S.; Piskorz, J. The continuous flash pyrolysis of biomass. *Can. J. Chem. Eng.* 1984, 62, 404-12.
15. Diehold, J. P.; Czernik, S. Additives to lower and stabilize viscosity of pyrolysis oils during storage. *Energy & Fuels* 1997, 11(5), 1081-1091.
16. Aubin, H.; Roy, C. Study on the corrosiveness of wood pyrolysis oils. *Fuel Science International* 1990, 8(1), 77-86.
17. Agblevor, F. A; Scahill, J.; Johnson, K. D. Pyrolysis char catalyzed destabilization of biocrude oils. In *Innovative Advances in the Forest Product Industries*; Brogdon, B. N.; Hart, P. W.; Ransdell, Scheller, B. L., Eds.; AIChE Symposium Series 319; American Institute of Chemical Engineers: New York, N.Y. 1998; Vol 94, pp. 146-150.
18. Agblevor, F. A; Besler-Guran, S. Inorganic compounds in biomass feedstocks. I. Effect on the quality of fast pyrolysis oils. *Energy & Fuels* 1996, 10(2), 293-298.
19. Agblevor, F. A.; Rejai, B.; Evans, R. J.; Johnson, K. D. Pyrolytic Analysis and Catalytic Upgrading of Lignocellulosic Materials by Molecular Beam Mass Spectrometry. In *Energy from Biomass and Wastes XVII*. Institute of Gas Technology (IOT), Chicago, Ill. 1993; pp. 767-795.
20. Sharma, R K.; Bakhshi, N. N. Upgrading of wood-derived bio-oil over HZSM-5. *Biuresuurce Technul.* 1991, 35(1), 57-66.
21. Srinvas, S. T.; Dalai, A. K.; Bakhshi, N. N. Thermal and catalytic upgrading of biomass derived oil in a dual reaction system. *Can. J. Chem. Eng.* 2000, 78(2), 343-54.
22. Sharma, R K.; Bakhshi, N. N. Catalytic upgrading of biomass-derived oils to transportation fuels and chemicals. *Can. J. Chem. Eng.* 1991, 69, 1071-81.
23. Bahtia, V. K.; Mittal, K. G.; Mehrotra, R P.; Garg, V. K.; Mehrotra, M.; Sarin, R. K. Catalytic conversion of Euphorbia nerifolia biocrude into petroleum hydrocarbons. Short Communications. *Fuel* 1988, 67, 1708-1709.
24. Weisz, P. B.; Haag, W. O.; Rhodewald, P. G. Catalytic production of high-grade fuel (gasoline) from biomass compounds by shape-selective catalysis. *Science* 179, 206, 5758.
25. Bahtia, V. K.; Padmaja, K. V.; Kamra, S; Singh, J.; Badoni, R. P. Upgrading of biomass constituents to liquid fuels. *Fuel* 1993, 72, 101-104.
26. Diebold, J.; Scahill, J. Biomass to Gasoline: Upgrading pyrolysis vapors to aromatic gasoline with zeolite catalysis at atmospheric pressure. In *Pyrolysis Oils from Biomass*; Soltes, E J.; Milne, T. A., Eds.; ACS Symposium Series 376; American Chemical Society: Washington: D.C., 1988; p. 264.
27. Chum, H.; Diebold, J.; Scahill, J.; Johnson, D.; Black, S.; Schroeder, H.; Kreibich, R. E. Biomass pyrolysis oil feedstocks for phenolic adhesives. In *Adhesives from Renewable Resources*; Hemingway, R W.; Conner, A. H.; Brabham, S J., Eds.; ACS Symposium Series 385, American Chemical Society: Washington D.C. 1989; pp. B5-151.

28. Elder, J. T. The characterization and potential utilization of phenolic compounds found in pyrolysis oil. Ph.D. Dissertation, Texas A&M University, 1979.
29. Russel, J.; Reinmath, W. F. Method for making adhesives from biomass. U.S. Pat. No. 4,508,886, 1985.
30. Rolin, A.; Richard, C.; Masson, D.; Deglise, X. Catalytic conversion of biomass by fast pyrolysis. *J. Anal. Appl. Pyrolysis* 1983, 5, 151-166.
31. Edyc, L. A; Richards, G. N.; Zheng, G. Transition metals as catalysts for pyrolysis and gasification of biomass. *Preprints, Fuel Chemistry Division;* 202nd ACS National Meetiug, New York, N.Y. 1991; p. 1715-1722.
32. Aznar, M. P.; Corella, J.; Delgado, I; Lahoz, J. Improved steam gasification of lignocellulosic residues in a fluidized bed with commercial steam reforming catalyst. *Ind. Eng. Chem. Res.* 1993, 32, 1-10.
33. Paisley, M. A. Anson, D. Biomass gasification for gas-turbine-based power generation. *J. Engineering/or Gas Turbines and Power,* 1998, 120(2), 284-8.
34. Di Blasi, C.; Signorelli, G.; Portoriccco, G. Countercurrent fixed-bed gasification of biomass at laboratory scale. *Ind. Eng. Chern. Res.* 1999, 38(7), 2571-81.
35. Corella, J.; Orio, A.; Aznar, P. Biomass gasification with air in fluidized bed: reforming of the gas composition with commercial steam reforming catalysts. *Ind. Eng. Chern. Res.* 1998, 37(7), 4617-24.
36. Agblevor, F. A.; BesJer-Guran, S.; WiseJogeJ, A. E. Production of oxygenated fuels from biomass: impact of feedstock storage. *Fuel Science & Technol. International,* 1996, 14(4), 589-612.
37. Home, P. A.; Williams, P. T. The effect of zeolite ZSM-5 catalyst deactivation using the upgrading of biomass derived pyrolysis vapors. *J. Anal. Appl. Pyrol.* 1995, 34, 65-85.
38. Milne, T. A.; Chum, H. L.; Agblevor, F.; Johnson, D. K. Standardized Analytical Methods. *Biomass &Bioenergy* 1992, 2 (1-6), 341-366.
39. Agblevor, F. A.; Beis S. H., Mante, O., Abdoulmoumine, N. *Ind. Eng. Chem. Res.,* 2010, 49, 3533-3538.

What is claimed is:

1. A process for producing pyrolysis oil comprising the steps of:
   providing a reactor containing multiple catalysts having different densities and different particle size distributions;
   fluidizing the catalysts;
   entraining a biomass in the fluidized catalysts, so that the biomass is pyrolyzed; and
   collecting the resultant pyrolysis oil.

2. The process of claim 1, wherein the catalysts are zeolite catalysts.

3. The process of claim 1, wherein the catalyst is heated to a temperature of about 400° C. to about 650° C.

4. The process of claim 1, wherein the increase in viscosity of the pyrolysis oil over the course of two years is less than 50%.

5. A process for producing fuel comprising the steps of
   providing a reactor containing multiple catalysts having different densities and different particle size distributions;
   fluidizing the catalysts;
   entraining a biomass in the fluidized catalysts, so that the biomass is pyrolyzed to produce pyrolysis oil; and
   cracking the pyrolysis oil.

6. The process of claim 5, wherein the catalysts are zeolite catalysts.

7. The process of claim 5, wherein the catalyst is heated to a temperature of about 400° C. to about 650° C.

8. The process of claim 5, wherein the increase in viscosity of the oil over the course of two years is less than 50%.

9. The process of claim 5, further comprising the step of blending the pyrolysis oil with gas oil prior to the cracking step to produce an oil blend.

10. The process of claim 9, wherein the oil blend contains about 5-45% by weight pyrolysis oil.

11. The process of claim 5, wherein the fuel is a drop-in fuel.

12. A process for producing fuel comprising the steps of
   producing pyrolysis oil using the process of claim 1;
   blending the pyrolysis oil with gas oil to produce an oil blend; and
   cracking the oil blend.

13. The process of claim 12, wherein the increase in viscosity of the pyrolysis oil over the course of two years is less than 50%.

14. The process of claim 12, wherein the fuel is a drop-in fuel.

15. The process of claim 12, wherein the fuel is gasoline, diesel, or jet fuel.

* * * * *